US007994915B2

(12) United States Patent
Sato

(10) Patent No.: US 7,994,915 B2
(45) Date of Patent: Aug. 9, 2011

(54) INFORMATION PROCESSING SYSTEM AND INFORMATION PROCESSING APPARATUS

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 462 days.

(21) Appl. No.: 10/596,966

(22) PCT Filed: Oct. 27, 2005

(86) PCT No.: PCT/JP2005/020168
§ 371 (c)(1),
(2), (4) Date: Jun. 30, 2006

(87) PCT Pub. No.: WO2006/049191
PCT Pub. Date: May 11, 2006

(65) Prior Publication Data
US 2008/0191839 A1    Aug. 14, 2008

(30) Foreign Application Priority Data

Nov. 8, 2004   (JP) .................................. 2004-323807

(51) Int. Cl.
*G08B 13/14* (2006.01)
(52) U.S. Cl. .................... 340/572.1; 235/380; 713/159; 713/169; 380/283; 382/115; 340/5.52
(58) Field of Classification Search ............. 340/572.1, 340/572.8, 825.3, 825.31, 825.33, 825.34, 340/5.52; 380/23, 24, 283, 284, 285; 713/159, 713/186, 169, 171
See application file for complete search history.

(56) References Cited

U.S. PATENT DOCUMENTS

| 4,189,712 | A | * | 2/1980 | Lemelson | 340/5.62 |
| 4,993,068 | A | * | 2/1991 | Piosenka et al. | 713/186 |
| 5,737,439 | A |   | 4/1998 | Lapsley |  |
| 6,018,581 | A | * | 1/2000 | Shona et al. | 380/46 |
| 6,111,506 | A | * | 8/2000 | Yap et al. | 340/572.1 |
| 6,137,834 | A | * | 10/2000 | Wine et al. | 375/240 |
| 6,476,715 | B1 | * | 11/2002 | Bromer | 340/468 |
| 6,672,512 | B2 | * | 1/2004 | Bridgelall | 235/462.46 |
| 6,695,207 | B1 | * | 2/2004 | Norris, Jr. | 235/382 |

(Continued)

FOREIGN PATENT DOCUMENTS

EP          1452945          9/2004

(Continued)

OTHER PUBLICATIONS

European Search Report filed on Feb. 5, 2008 in connection with European Patent Application No. 05800162.9.

(Continued)

*Primary Examiner* — Benjamin C Lee
*Assistant Examiner* — Quang Pham
(74) *Attorney, Agent, or Firm* — SNR Denton US LLP

(57) ABSTRACT

An information processing apparatus includes an equipment means equipped on a predetermined portion of a living body and has a storage means which a first biological identification data associated with the predetermined portion of the living body, and a communication means which is held by the equipment means and transmits the first biological identification data to a communication target to which the predetermined position equipped with the equipment means is brought close. A biological authentication means which performs biological authentication, based on the first biological identification data and on a second biological identification data, said second biological identification data being extracted from biological information detected by a biological sensor.

10 Claims, 20 Drawing Sheets

U.S. PATENT DOCUMENTS

| | | | | |
|---|---|---|---|---|
| 6,813,010 | B2 * | 11/2004 | Kono et al. | 356/71 |
| H2120 | H * | 7/2005 | Cudlitz | 235/382 |
| 7,047,408 | B1 * | 5/2006 | Boyko et al. | 713/169 |
| 7,644,265 | B2 * | 1/2010 | Kudo et al. | 713/150 |
| 2001/0017584 | A1 * | 8/2001 | Shinzaki | 340/5.52 |
| 2001/0029488 | A1 * | 10/2001 | Takeshima et al. | 705/41 |
| 2001/0033220 | A1 * | 10/2001 | Stone et al. | 340/5.52 |
| 2001/0038422 | A1 * | 11/2001 | Yamada et al. | 348/478 |
| 2001/0054951 | A1 * | 12/2001 | Kimoto et al. | 340/5.53 |
| 2002/0018569 | A1 * | 2/2002 | Panjwani et al. | 380/247 |
| 2002/0024419 | A1 * | 2/2002 | Dunn | 340/5.52 |
| 2002/0025046 | A1 * | 2/2002 | Lin | 380/282 |
| 2002/0120668 | A1 * | 8/2002 | Pintsov et al. | 709/200 |
| 2002/0150282 | A1 * | 10/2002 | Kinsella | 382/124 |
| 2002/0154779 | A1 * | 10/2002 | Asano et al. | 380/277 |
| 2002/0166047 | A1 * | 11/2002 | Kawamoto | 713/169 |
| 2002/0169971 | A1 * | 11/2002 | Asano et al. | 713/193 |
| 2002/0184641 | A1 * | 12/2002 | Johnson et al. | 725/105 |
| 2002/0197979 | A1 * | 12/2002 | Vanderveen | 455/410 |
| 2003/0018522 | A1 * | 1/2003 | Denimarck et al. | 705/14 |
| 2003/0037264 | A1 * | 2/2003 | Ezaki et al. | 713/202 |
| 2003/0048173 | A1 * | 3/2003 | Shigematsu et al. | 340/5.52 |
| 2003/0088618 | A1 * | 5/2003 | Sueyoshi et al. | 709/203 |
| 2003/0145203 | A1 * | 7/2003 | Audebert et al. | 713/169 |
| 2003/0167207 | A1 * | 9/2003 | Berardi et al. | 705/16 |
| 2003/0167398 | A1 * | 9/2003 | Sueyoshi et al. | 713/189 |
| 2003/0173408 | A1 | 9/2003 | Mosher et al. | |
| 2003/0228886 | A1 * | 12/2003 | Ishii et al. | 455/558 |
| 2004/0022421 | A1 * | 2/2004 | Endoh et al. | 382/115 |
| 2004/0041690 | A1 * | 3/2004 | Yamagishi | 340/5.52 |
| 2004/0059685 | A1 * | 3/2004 | Sakamura et al. | 705/65 |
| 2004/0059925 | A1 * | 3/2004 | Benhammou et al. | 713/189 |
| 2004/0098587 | A1 * | 5/2004 | Sueyoshi et al. | 713/169 |
| 2004/0108377 | A1 * | 6/2004 | Rietveld | 235/380 |
| 2004/0120556 | A1 * | 6/2004 | Kono et al. | 382/124 |
| 2004/0162988 | A1 * | 8/2004 | Harper | 713/186 |
| 2004/0179588 | A1 * | 9/2004 | Kuffner et al. | 375/224 |
| 2004/0193898 | A1 * | 9/2004 | Ochi et al. | 713/189 |
| 2004/0208632 | A1 * | 10/2004 | Dietz et al. | 398/182 |
| 2004/0239481 | A1 * | 12/2004 | Beenau et al. | 340/5.53 |
| 2004/0259499 | A1 * | 12/2004 | Oba et al. | 455/41.2 |
| 2004/0268131 | A1 * | 12/2004 | Kudo et al. | 713/182 |
| 2005/0010769 | A1 * | 1/2005 | You et al. | 713/168 |
| 2005/0061875 | A1 * | 3/2005 | Zai et al. | 235/383 |
| 2005/0076212 | A1 * | 4/2005 | Mishina et al. | 713/168 |
| 2005/0081035 | A1 * | 4/2005 | Togawa | 713/171 |
| 2005/0086479 | A1 * | 4/2005 | Ondet et al. | 713/172 |
| 2005/0102527 | A1 * | 5/2005 | Tatebayashi et al. | 713/189 |
| 2005/0108522 | A1 * | 5/2005 | Guthery | 713/159 |
| 2005/0114619 | A1 * | 5/2005 | Matsuo et al. | 711/170 |
| 2005/0148876 | A1 * | 7/2005 | Endoh et al. | 600/454 |
| 2005/0173518 | A1 * | 8/2005 | Takayama | 235/380 |
| 2005/0210249 | A1 * | 9/2005 | Lee et al. | 713/168 |
| 2005/0212657 | A1 * | 9/2005 | Simon | 340/5.74 |
| 2006/0050877 | A1 * | 3/2006 | Nakamura | 380/46 |
| 2006/0265735 | A1 * | 11/2006 | Ohno | 726/2 |
| 2007/0294528 | A1 * | 12/2007 | Shoji et al. | 713/159 |
| 2008/0258864 | A1 * | 10/2008 | Hattori et al. | 340/5.8 |

FOREIGN PATENT DOCUMENTS

| | | |
|---|---|---|
| JP | 01-248284 | 10/1989 |
| JP | 10-149446 | 6/1998 |
| JP | 2000-000108 | 1/2000 |
| JP | 2000-040156 | 2/2000 |
| JP | 2000-215294 | 8/2000 |
| JP | 2001-126067 | 5/2001 |
| JP | 2001-291103 | 10/2001 |
| JP | 2003-288561 | 10/2003 |
| WO | WO99/60500 | 11/1999 |
| WO | 01/54074 | 7/2001 |
| WO | 02/078199 | 10/2002 |
| WO | 2004/021884 | 3/2004 |

OTHER PUBLICATIONS

International Search Report dated Jan. 17, 2006.

* cited by examiner (A) NO COMMUNICATION ERRORS (B) COMMUNICATION ERROR D13$_2$

INFORMATION PROCESSING SYSTEM AND INFORMATION PROCESSING APPARATUS

TECHNICAL FIELD

The present invention relates to an information processing system and an information processing apparatus which are preferably used in case of authenticating data based on blood vessels inherent to a living body.

BACKGROUND ART

Conventional authentication devices which execute an authentication processing based on a formation pattern of blood vessels inherent to a living body (which will be called a blood vessel formation pattern hereinafter) have been proposed.

This kind of authentication device picks up an image of a registrant by utilizing a characteristic that light within a near infrared band is peculiarly absorbed by deoxygenated hemoglobin (venous blood) or oxygenated hemoglobin (arterial blood). From a blood vessel image obtained as a result of the picking up of an image, a blood vessel formation pattern (hereinafter called a registered blood vessel formation pattern) is extracted and registered in a predetermined database.

The authentication device further extracts a blood vessel formation pattern of a target to authenticate (which will be called an authentication target's blood vessel formation pattern) like in the process of registration as described above, and compares this blood vessel formation pattern of the target sequentially with plural registered blood vessel formation patterns which have been registered in advance in a database. Thus, whether the target is an identical person (to the registrant) or not is determined (see, for example, Patent Document 1).

Patent Document 1: Japanese Patent Application No. 2003-242492

However, in this kind of authentication device, plural registered blood vessel formation patterns are sequentially compared until a registered blood vessel formation pattern corresponding to the authentication target's blood vessel formation pattern is found. Therefore, processing time required for comparison with the authentication target's blood vessel formation pattern tends to extend. This results in a problem that users have to wait for a longer time.

In particular, as the number of registered blood vessel formation pattern registered in the database increases, required processing time extends. This tendency results in that waiting time for users becomes much longer.

DISCLOSURE OF THE INVENTION

The present invention has been made in consideration of the above and has an object of providing an information processing system and an information processing apparatus which are capable of remarkably improving usability.

To achieve this object, according to the present invention, an information processing system comprises first and second information processing apparatuses, wherein the first information processing apparatus includes a storage means which stores an identification target at a predetermined portion of a living body, as biological identification data, and a first communication means which is brought close to a predetermined position, held by the living body, and performs communication kept close at the predetermined position, and the second information processing apparatus includes a biological sensor which detects the living body kept close to the position, as biological data, a second communication means which communicates with the first communication means held by the living body kept close to the predetermined position, an extraction means which extracts biological data corresponding to the predetermined portion, from the biological data detected by the biological sensor, and a biological authentication means which performs biological authentication, based on the biological data corresponding to the predetermined portion and extracted by the extraction means, and on the biological identification data obtained from the first information processing apparatus via the first and second communication means.

Therefore, in this information processing system, the first information processing apparatus only needs to be brought close to the second information processing apparatus. Then, the second information processing apparatus can automatically obtain biological data of a user who holds the first information processing apparatus. Accordingly, a processing of reading and comparing respective biological identification data in an arbitrary order from a database in the second information processing apparatus can be obviated, compared with another case where all of the biological identification data respectively stored in plural first information processing apparatuses are registered as the database in the second information processing apparatus. Time spent for the processing can be remarkably shortened.

Also according to the present invention, an information processing apparatus comprises: a biological sensor which detects a living body brought close to a predetermined position, as biological data; a near-distance communication means which communicates with a communication target held by the living body brought close to the predetermined position; an extraction means which extracts biological data at the predetermined portion, from the biological data detected by the biological sensor, and a biological authentication means which performs comparison, based on the biological data at the predetermined portion and extracted by the extraction means with the biological identification data registered in the communication target and obtained from the communication target via the near-distance communication means.

Therefore, in this information processing apparatus, biological data of a user who holds the communication target can be automatically obtained if only the communication target is brought close. Accordingly, a processing of reading and comparing respective biological identification data in an arbitrary order from a database can be obviated, compared with another case where all of the biological identification data respectively stored in plural communication targets are registered as the database. Time spent for the processing can be remarkably shortened.

Further according to the present invention, an information processing apparatus comprises: an equipment means which is equipped on a predetermined portion of a living body; a storage means which stores an identification target at a predetermined portion of a living body, as biological identification data, and a communication means which is held by the equipment means and transmits the biological identification data to the communication target to which the predetermined portion equipped with the equipment means is brought close, wherein by the communication target, the living body which has been brought close with the equipment means equipped is detected as biological data.

Therefore, in this information processing apparatus, biological data of a user who holds the communication target can be automatically obtained if only the equipment means equipped at the predetermined portion of the living body is brought close to the communication target. Accordingly, a processing of reading and comparing respective biological identification data in an arbitrary order from a database can be obviated, compared with another case where all of the biological identification data respectively stored in plural information processing apparatuses are registered as the database in the communication target. Time spent for the processing can be remarkably shortened.

According to the information processing system of the present invention, the first information processing apparatus only needs to be brought close to the second information processing apparatus. Then, the second information processing apparatus can automatically obtain biological data of a user who holds the first information processing apparatus. Accordingly, a processing of reading and comparing respective biological identification data in an arbitrary order from a database in the second information processing apparatus can be obviated, compared with another case where all of the biological identification data respectively stored in plural first information processing apparatuses are registered as the database in the second information processing apparatus. In accordance with shortening of time spent for the processing, user's waiting time can be shortened. Thus, usability can improve remarkably.

Also according to the information processing apparatus of the present invention, biological data of a user who holds the communication target can be automatically obtained if only the communication target is brought close. Accordingly, a processing of reading and comparing respective biological identification data in an arbitrary order from a database can be obviated, compared with another case where all of the biological identification data respectively stored in plural communication targets are registered as the database. In accordance with shortening of time spent for the processing, user's waiting time can be remarkably shortened. Thus, usability can improve remarkably.

Further according to the information processing apparatus of the present invention, biological data of a user who holds the communication target can be automatically obtained if only the equipment means equipped at the predetermined portion of the living body is brought close to the communication target. Accordingly, a processing of reading and comparing respective biological identification data in an arbitrary order from a database can be obviated, compared with another case where all of the biological identification data respectively stored in plural information processing apparatuses are registered as the database in the communication target. In accordance with shortening of time spent for the processing, user's waiting time can be remarkably shortened. Thus, usability can improve remarkably.

BEST MODE FOR CARRYING OUT THE INVENTION

Hereinafter, an embodiment of the present invention will be described specifically with reference to the drawings.

Figure 1:
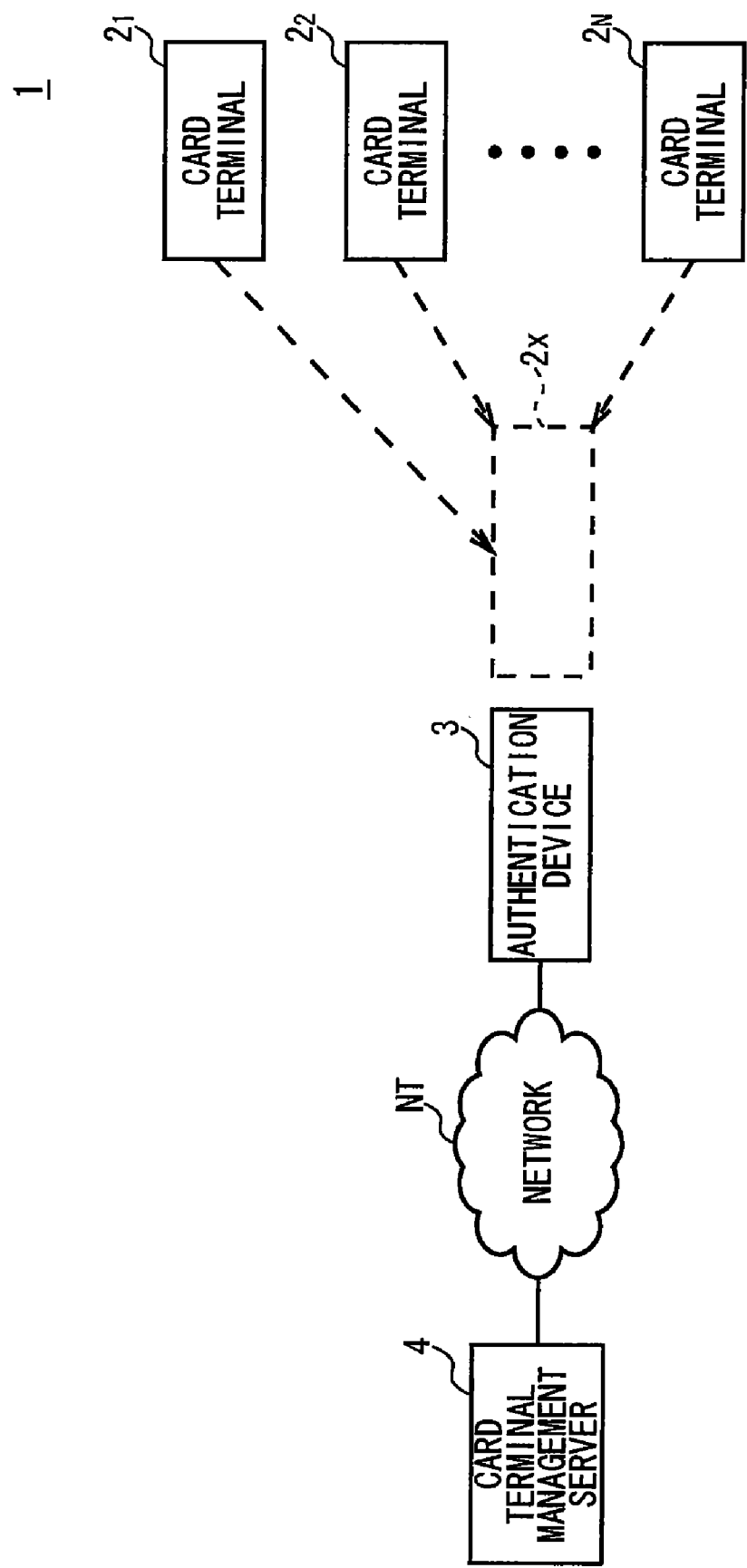
FIG. 1 is a schematic diagram showing the entire configuration of an information processing system according to a first embodiment.

(1) First Embodiment (1-1) Entire Configuration of an Information Processing System According to the First Embodiment In FIG. 1, a reference numeral 1 denotes, as a whole, the information processing system according to the first embodiment, which is constituted by plural terminal devices (hereinafter called card terminals) $2i$ (where i=1, 2, ..., N) each having a card-like shape, an authentication device 3, and a card terminal management server 4.

The card terminals 2i have been respectively issued to users as targets for whom predetermined services are provided. Each of the card terminals $2i$ maintains a pattern forming blood vessels (hereinafter called a blood vessel formation pattern) which a corresponding user internally has, as registered data (hereinafter called registered blood vessel pattern data).

On one side, the authentication device 3 is placed at a predetermined placement location. This device 3 is configured such that whether or not a user who is going to receive a service is the identical person to a regular user (hereinafter called a registrant) who has registered his or her own blood vessel formation pattern is determined based on registered blood vessel pattern data maintained in each card terminal $2i$. Although this information processing system 1 relates to a case of placing one authentication device 3, plural authentication devices 3 may be placed at predetermined placement locations.

On the other side, the card terminal management server 4 is configured so as to manage the card terminals 2$i$, based on inherent terminal IDs (Identifiers) maintained by the card terminal 2$i$, respectively.

When a service is provided by this information processing system 1, a user brings a card terminal 2$x$ ($x$=1, 2, ..., or N) close to over a predetermined position of the authentication device 3. In this case, the authentication device 3 obtains a blood vessel formation pattern of the user's hand by which the card terminal 2$x$ is approximated. The device 3 also relays mutual authentication between the card terminal 2$x$ based on the terminal ID and the card terminal management server 4. In response to an authentication result thereof, the authentication device 3 obtains registered blood vessel pattern data maintained in the card terminal 2$x$.

In this state, the authentication device 3 compares a blood vessel formation pattern obtained from the user with another blood vessel formation pattern expressed by the registered blood vessel pattern data obtained from the card terminal 2$x$. Then, whether the target is an identical person or not is determined.

Thus, in the information processing system 1, the card terminal 2$x$ needs only to be brought close to the authentication device 3. The authentication device 3 then automatically obtains a blood vessel formation pattern of the user who just holds the card terminal 2$x$, and compares this blood vessel formation pattern with another blood vessel formation pattern which has registered in advance in the card terminal 2$x$.

Accordingly, the information processing system 1 can avoid a process of reading and comparing blood vessel formation patterns in an arbitrary order from the database in the authentication device 3, compared with a case of registering all of the blood vessel formation patterns respectively stored in plural card terminals 2$i$, as a database in the authentication device 3. Therefore, time for the process can be saved so that time can be greatly reduced.

Also the information processing system 1 can more safely avoid blood vessel formation patterns registered in the database from being stolen and fraudulently used by a manager of the authentication device 3, compared with a case of registering all of the blood vessel formation patterns respectively stored in plural card terminals 2$i$, as a database in the authentication device 3. Therefore, reliability of the blood vessel formation patterns can improve.

Further in this information processing system 1, blood vessels as intrinsic tissue existing inside a living body are chosen as an authentication target. Compared with another case of using as an authentication target a fingerprint or the like appearing on the surface of a living body, the system 1 can more safely prevent not only direct steals from the living body but also masquerading of a third person as a registrant.

(1-2) Structures of the Card Terminal and Authentication Device

Figure 2:
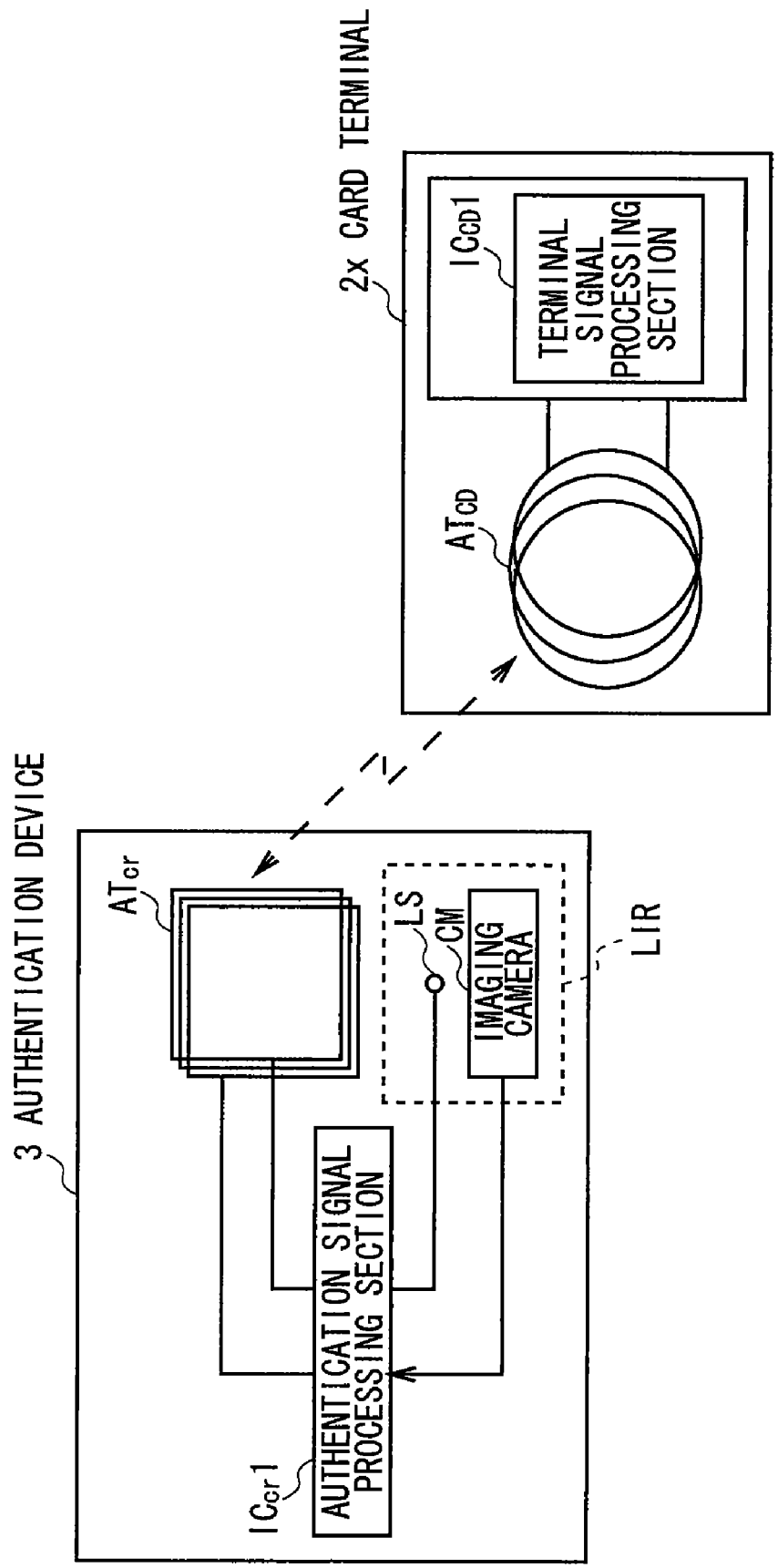
FIG. 2 is a schematic diagram showing configurations of a card terminal and an authentication device (1).
Figure 3:
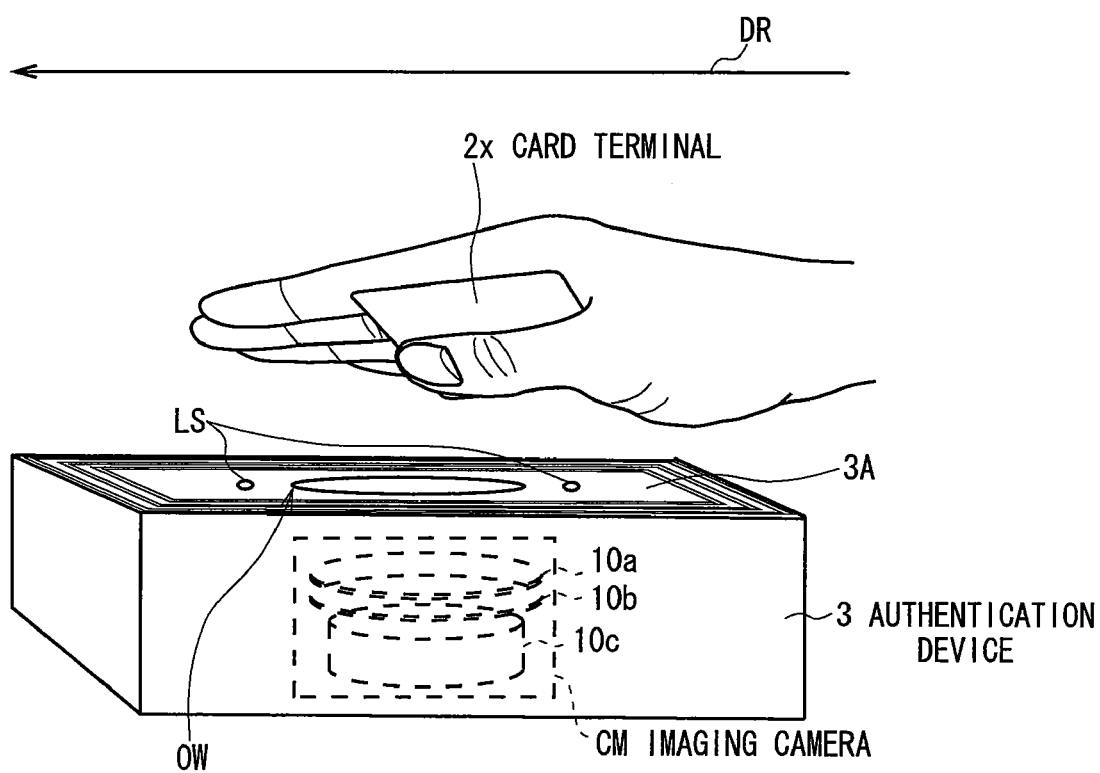
FIG. 3 is a schematic diagram showing a configuration of the card terminal and authentication device (2).

FIGS. 2 and 3 respectively show the structures of the card terminal 2$x$ and authentication device 3.

The card terminal 2$x$ includes an antenna coil (hereinafter called a terminal antenna) $AT_{CD}$ and a signal processing section (hereinafter called a terminal signal processing section) $IC_{CD}1$ connected to the antenna coil $AT_{CD}$, at predetermined positions. A terminal ID and registered blood vessel pattern data are registered in the terminal signal processing section $IC_{CD}1$.

When an electromagnetic induction signal fed from the authentication device 3 is received via the terminal antenna $AT_{CD}$, the terminal signal processing section $IC_{CD}1$ starts up, using as a drive voltage a voltage induced in response to the signal received. The authentication device 3 performs mutual authentication by exchanging various data with a card terminal management server 4 via the authentication device 3 and a network NT (FIG. 1).

The terminal signal processing section $IC_{CD}1$ also encrypts registered blood vessel pattern data by use of encryption data supplied from the authentication device 3 in response to the authentication, and transmits the encrypted registered blood vessel pattern data to the authentication device 3 via the terminal antenna $AT_{CD}$.

Meanwhile, the authentication device 3 has, for example, a rectangular cylindrical shape. A face (hereinafter called an approach face) 3A to which the card terminal 2$x$ is brought near is chosen and defined on the housing of the authentication device 3. An open window OW made of colorless transparent glass is formed in the approach face 3A, and an antenna coil (hereinafter called an authentication antenna) $AT_{cr}$ is provided surrounding the open window OW.

The authentication antenna $AT_{cr}$ is connected to a signal processing section (hereinafter called an authentication signal processing section) $IC_{cr}1$ built in at a predetermined position in the housing of the authentication device 3. The authentication signal processing section $IC_{cr}1$ is configured to send an electromagnetic induction signal via the authentication antenna $AT_{cr}$. By the electromagnetic induction signal, the card terminal 2$x$ which has been set near to the approach face 3A is started up in a battery free state.

In addition to the structure as described above, the authentication signal processing section $IC_{cr}1$ is connected to a biological information read section LIR which reads blood vessels in the hand grasping the card terminal 2$x$ set near to the approach face 3A. This biological information read section LIR is constituted by an imaging camera CM (FIG. 3) provided below the open window OW, and one or two or more near infrared light sources LS provided at predetermined positions on the approach face 3A.

In case of this embodiment, the hand grasping the card terminal 2$x$ and the approach face 3A are configured to be situated close to each other with a predetermined positional relationship kept therebetween. For example, as shown in FIG. 3, the hand and the approach face 3A are brought close to each other such that the finger pads of fingers of the hand are parallel to the approach face 3A and opposed thereto from a predetermined direction DR.

Alternatively, the hand may be let actively approach the approach face 3A, or may be let passively approach the face via a member (not shown) to locate the hand at a predetermined position. Registered blood vessel pattern data stored in advance in the terminal signal processing section $IC_{CD}1$ (FIG. 2) are data express a blood vessel formation pattern extracted from a hand situated in a predetermined positional relationship with the approach face 3A.

In case where the hand grasping the card terminal 2$x$ is thus let approach the approach face 3A, the authentication signal processing section $IC_{cr}1$ is supplied with data concerning mutual authentication from the card terminal 2$x$ upon startup of the card terminal 2$x$.

In this case, the authentication signal processing section $IC_{cr}1$ connects the card terminal management server 4 (FIG. 1) via the network NT (FIG. 1), and performs transmission concerning the mutual authentication to the card terminal management server 4 via the network NT. Upon reception of data concerning the mutual authentication supplied from the card terminal management server 4, the authentication signal processing section $IC_{cr}1$ transmits the data to the card terminal 2x via the authentication antenna $AT_{cr}$.

On the other side, the authentication signal processing section $IC_{cr}1$ drives the biological information read section LIR. In this case, as indicated by broken lines in FIG. 4, the near infrared light emitted into an imaging space from the near infrared light source LS is emitted on the fingers of the hand grasping the card terminal 2x. The near infrared light is absorbed by hemoglobin flowing in the blood vessels existing in the fingers. Simultaneously, the near infrared light is scattered and reflected by tissue other than the blood vessels, and goes out of the fingers. The outgoing near infrared light is obtained as such near infrared light that projects the blood vessels (hereinafter called blood vessel projection light). This blood vessel projection light runs from the open window OW (FIG. 1) sequentially through an imaging lens 10a of the imaging camera CM, a diaphragm (not shown), and a near infrared light pass filter 10b, and enters into a solid state imaging element 10c.

The authentication signal processing section $IC_{cr}1$ controls the imaging camera CM, to adjust the focus distance and focus position of the imaging lens 10a, as well as adjust the light quantity of the blood vessel projection light entering into the solid state imaging element 10c. Further, the authentication signal processing section $IC_{cr}1$ generates, at predetermined timing, a blood vessel image signal from an image formed on a imaging plane of the solid state imaging element 10c, and extracts a blood vessel formation pattern from the blood vessel image signal.

Also, if mutual authentication between the card terminal 2x and the card terminal management server 4 is completed successfully, the authentication signal processing section $IC_{cr}1$ transmits a predetermined encryption key to the card terminal 2x via the authentication antenna $AT_{cr}$ in response to the successful mutual authentication. Further, the authentication signal processing section $IC_{cr}1$ receives registered blood vessel pattern data encrypted by the encryption key, from the card terminal 2x via the authentication antenna $AT_{cr}$, and then decrypts the data.

Thus, the authentication signal processing section $IC_{cr}1$ obtains a blood vessel formation pattern extracted from the user as an imaging target and another blood vessel formation pattern expressed by the registered blood vessel pattern data registered in the card terminal 2x.

The authentication signal processing section $IC_{cr}1$ further compares these blood vessel formation patterns, to determine presence or absence of the person identical to the registrant, depending on the comparison result. This determination result is notified to a service providing processing section mounted in the authentication device or connected externally to the authentication device 3. The service providing processing section accordingly provides a predetermined service for the registrant.

(1-3) Specific Circuit Configurations of the Signal Processing Sections

Next, specific circuit configurations of the terminal signal processing section $IC_{CD}1$ and authentication signal processing section $IC_{cr}1$ will be described.

Figure 5:
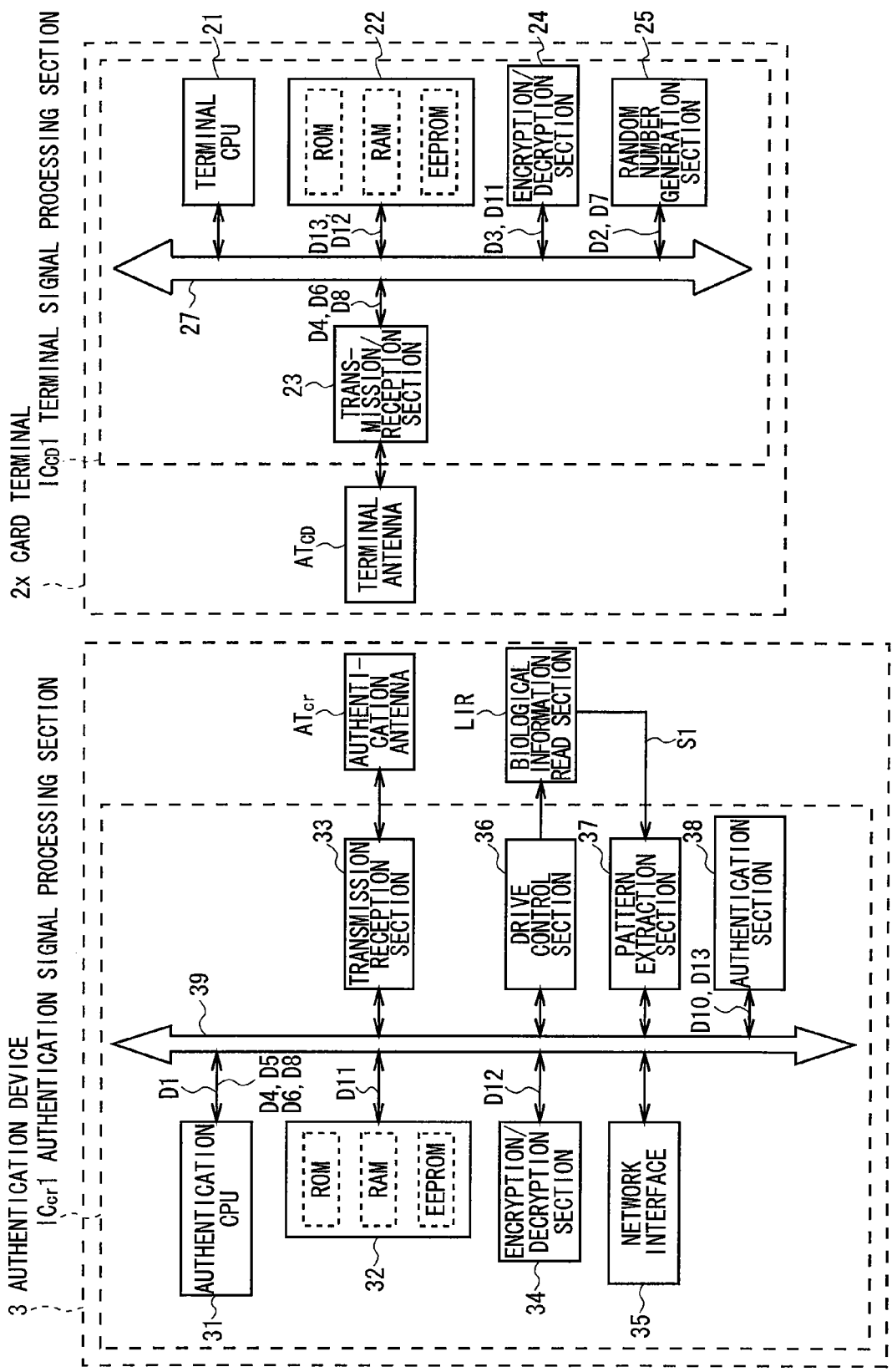
FIG. 5 is a schematic diagram showing specific circuit configurations of a terminal signal processing section and an authentication processing section according to the first embodiment.

In FIG. 5, the terminal signal processing section $IC_{CD}1$ of the card terminal 2x is constituted by mutually connecting an internal memory 22, a transmission/reception section 23, an encryption/decryption section 24, and a random number generation section 25 each via a bus 26 to a CPU (Central Processing Unit: hereinafter called a terminal CPU) 21 which controls the whole terminal signal processing section $IC_{CD}1$. The internal memory 22 is constituted by a ROM (Read Only Memory) with a program, various setting data, and the like stored therein, a RAM (Random Access Memory) as a work memory, and an EEPROM (Electrically Erasable Programmable Read Only Memory) with various parameters stored therein. The transmission/reception section 23 transmits/receives various signals according to an electromagnetic induction scheme.

Upon reception of an electromagnetic induction signal supplied from the authentication device 3 via the terminal antenna $AT_{CD}$, the transmission/reception section 23 accumulates a voltage induced in response thereto, in an internal battery (not shown). If the accumulated voltage reaches a predetermined threshold value, the voltage is supplied as a drive voltage to each circuit section. As a result of this, the card terminal 2x starts up.

In this state, the terminal CPU 21 generates startup notification data D1 to notify the startup, based on a program and setting data stored in the ROM in the internal memory 22. Further, the terminal CPU 21 transmits the startup notification data D1 to the authentication device 3 sequentially through the transmission/reception section 23, and the terminal antenna $AT_{CD}$, and controls respective circuit sections to perform mutual authentication with the card terminal management server 4.

Meanwhile, the authentication signal processing section $IC_{cr}1$ of the authentication device 3 is constituted by mutually connecting an internal memory 32, a transmission/reception section 33, an encryption/decryption section 34, a network interface 35, a drive control section 36, a pattern extraction section 37, and an authentication section 38 each via a bus 39 to a CPU (hereinafter called an authentication CPU) 31 which controls the whole authentication signal processing section $IC_{cr}1$. The internal memory 32 is constituted by a ROM with a program, various setting data, and the like stored therein, a RAM as a work memory of the authentication CPU 31, and an EEPROM with various parameters stored therein. The transmission/reception section 33 transmits/receives various signals according to an electromagnetic induction scheme. The drive control section 36 drives and controls the biological information read section LIR. The pattern extraction section 37 extracts a blood vessel formation pattern from a reading result from the biological information read section LIR.

The transmission/reception section 33 sends an electromagnetic induction signal via the authentication antenna $AT_{cr}$. When startup notification data D1 sent from the card terminal 2x started up by the electromagnetic induction signal are received via the authentication antenna $AT_{cr}$, the transmission/reception section 33 sends out the data to the authentication CPU 31.

Upon reception of the startup notification data D1 supplied from the transmission/reception section 33, the authentication CPU 31 controls respective circuit sections, based on the program and setting data stored in the ROM of the internal memory 32, to relay mutual authentication between the card terminal 2x and the card terminal management server 4.

(1-4) Relay Processing of Mutual Authentication

Now, the relay processing of relaying mutual authentication in the authentication device 3 will be described specifically together with mutual authentication between the card terminal 2x and the authentication device 3.

In actual, the terminal CPU 21 generates, upon startup, data D2a taking the terminal ID as a seed (Seed) (hereinafter called seed data) and data D2b which diffuses the seed data D2a (hereinafter called diffusion data), and sends these data to the random number generation section 25.

The random number generation section 25 diffuses the seed data D2a by the diffusion data D2b thereby to generate data D3 of a random number pattern (hereinafter called random number pattern data). The random number generation section 25 further sends the data to the encryption/decryption section 24.

The encryption/decryption section 24 performs a predetermined encryption processing such as DES (Data Encryption Standard), on the random number pattern data D3, by use of key information which has been maintained in advance. The encryption/decryption section 24 transmits encrypted random number pattern data D4 obtained as a result of the encryption processing, to the authentication device 3 sequentially through the transmission/reception section 23 and the terminal antenna $AT_{CD}$.

The authentication CPU 31 of the authentication device 3 receives startup notification data D1 from the card terminal 2x via the authentication antenna $AT_{cr}$ and transmission/reception section 33, and then connects with the card terminal management server 4 via the network NT (FIG. 1) from the network interface 35. Thereafter, the authentication CPU 31 receives the encrypted random number pattern data D4 transmitted from the card terminal 2x, sequentially through the authentication antenna $AT_{cr}$ and the transmission/reception section 33. The authentication CPU 31 then transmits the encrypted random number pattern data D4 to the card terminal management server 4 from the network interface 35.

In the card terminal management server 4, the encrypted random number pattern data D4 is subjected to a predetermined decryption processing by use of key information maintained in advance in the card terminal management server 4, and is thereafter subjected to a back-diffusion processing. The terminal ID (seed data D2a) of the card terminal 2x is thereby obtained.

In this state, if the terminal ID (seed data D2a) exists in the database maintained in the card terminal management server 4, the card terminal management server 4 determines that the current communication partner is the card terminal 2x. On the other side, if the terminal ID does not exist in the database, the current communication partner is determined as masquerading to be the card terminal 2x. This determination result is transmitted as management determination data D5 to the authentication device 3.

Also in the card terminal management server 4, the terminal ID of the card terminal 2x is diffused again by diffusion data corresponding to the diffusion data D2b. A diffusion result thereof is subjected to an encryption processing by use of the same key information as that of the card terminal 2x. Encrypted random number pattern data D6 obtained as a result is transmitted to the authentication device 3.

The authentication CPU 31 of the authentication device 3 receives the management determination data D5 and encrypted random number pattern data D6 supplied from the card terminal management server 4 via the network interface 35. The authentication CPU 31 temporarily stores the management determination data D5 in the internal memory 32, and transmits the encrypted random number pattern data D6 to the card terminal 2x sequentially through the transmission/reception section 33 and the authentication antenna $AT_{cr}$.

The terminal CPU 21 of the card terminal 2x receives the encrypted random number pattern data D6 sent back from the authentication device 3, sequentially through the terminal antenna $AT_{CD}$ and the transmission/reception section 23. The terminal CPU 21 then performs a decryption processing on the encrypted random number pattern data D6 by use of key information. The random number generation section 25 generates seed data D7 by back-diffusing a decryption processing result thereof by the diffusion data D2b.

Further, if the terminal ID expressed by the seed data D7 agrees with the own terminal ID, the terminal CPU 21 determines that the current communication partner is the authentication device 3. On the other side, if the terminal ID expressed by the seed data D7 does not agree with the own terminal ID, the terminal CPU 21 determines that the current communication partner as masquerading to be the authentication device 3. The terminal CPU 21 transmits this determination result as terminal determination data D8 to the authentication device 3 sequentially through the transmission/reception section 23 and the terminal antenna $AT_{CD}$.

Thus, the authentication CPU 31 of the authentication device 3 relays various data concerning mutual authentication between the card terminal 2x and the authentication device 3. Accordingly, the management determination data D5 and the terminal determination data D8 each can be obtained as a mutual authentication processing result.

(1-5) Biological Authentication Processing

Next, the biological authentication processing will be described specifically.

Figure 4:
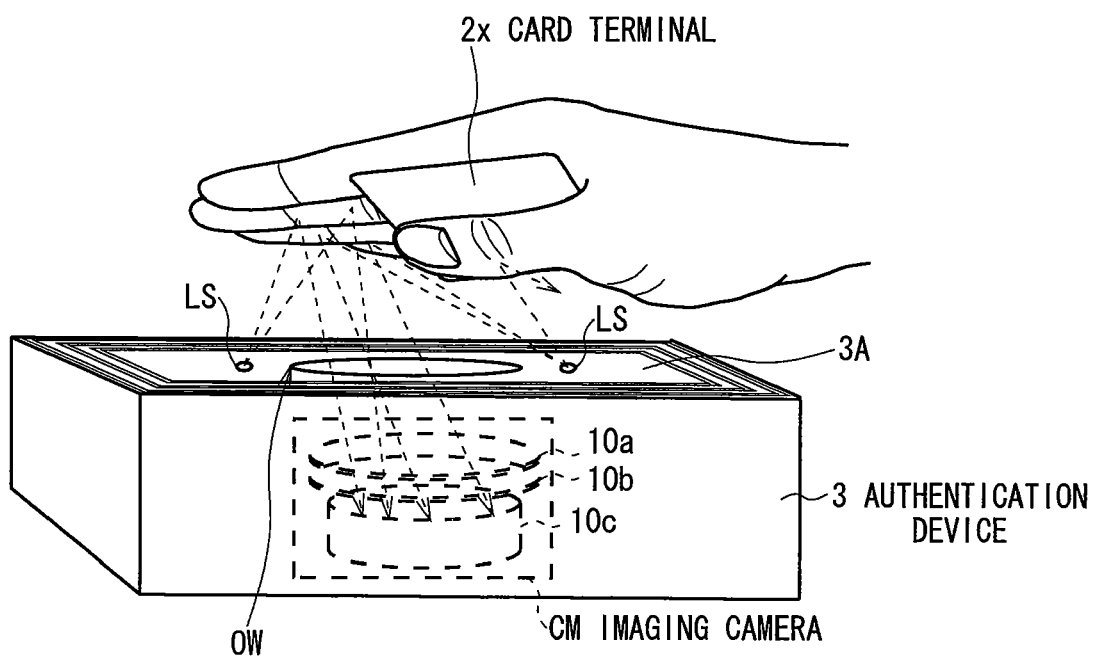
FIG. 4 is a schematic diagram showing light paths of near infrared light (1).

In actual, the authentication CPU 31 receives startup notification data D1 from the card terminal 2x sequentially through the authentication antenna $AT_{cr}$ and the transmission/reception section 33. Then, the terminal CPU 21 controls biological information read section LIR through the drive control section 36. Blood vessels inside fingers of the hand grasping the card terminal 2x which is brought near to the approach face 3A (FIGS. 3 and 4) are imaged by the imaging camera CM of the biological information read section LIR (FIGS. 3 and 4).

Further, through the pattern extraction section 37, the authentication CPU 31 performs various processings on a blood vessel image signal S1 obtained as an imaging result. The processings are, for example, an A/D (Analog/Digital) conversion processing, a binarization processing, a blood vessel linearization processing, a characteristic point extraction processing to extract branch points and the like. The authentication CPU 31 sends data D10 obtained as a result of this to the authentication section 38.

On the other side, if determination results of the terminal determination data D8 and the management determination data D5 which are obtained from the card terminal 2x and the authentication device 3 as a result of mutual authentication relay processing, are indicative of successful authentication of each other, the authentication CPU 31 performs, through the encryption/decryption section 34, a predetermined encryption processing on an authentication encryption key D11 stored in advance in the internal memory 32, by use of a secret key. The authentication CPU 31 transmits the authentication encryption key D11 thus encrypted, to the card terminal 2x sequentially through the transmission/reception section 33 and authentication antenna $AT_{cr}$.

The terminal CPU 21 of the card terminal 2x receives the encrypted authentication encryption key D11 sequentially through the transmission/reception section 23 and the terminal antenna $AT_{CD}$. Then, through the encryption/decryption section 24, the terminal CPU 21 performs a predetermined encryption processing on a terminal encryption key D12 stored in advance in the internal memory 22 by use of a secret key. The terminal CPU 21 transmits the encrypted terminal encryption key D12 to the authentication device 3 sequentially through the transmission/reception section 23 and the terminal antenna $AT_{CD}$.

Also, the terminal CPU 21 performs, through the encryption/decryption section 24, a predetermined decryption processing on the authentication encryption key D11 by use of a secret key. Further, the terminal CPU 21 encrypts registered pattern data D13 registered in the EEPROM in the internal memory 22, by use of the decrypted authentication encryption key D11. Simultaneously, the terminal CPU 21 encrypts the registered pattern data D13 encrypted by the authentication encryption key D11, further by use of the terminal encryption key D12. The terminal CPU 21 transmits the double encrypted registered pattern data D13 to the authentication device 3 sequentially through the transmission/reception section 23 and the terminal antenna $AT_{CD}$.

The authentication CPU 31 of the authentication device 3 receives the encrypted terminal encryption key D12 sequentially through the authentication antenna $AT_{cr}$ and the transmission/reception section 33. The authentication CPU 31 then performs, through the encryption/decryption section 34, a predetermined decryption processing on the encrypted terminal encryption key D12 by use of a secret key.

The authentication CPU 31 also waits for double encrypted registered pattern data D13 which is to be transmitted thereafter from the card terminal 2x. Further, the authentication CPU 31 receives the double encrypted registered pattern data D13. Then, the authentication CPU 31 decrypts the data D13 by use of the decrypted terminal encryption key D12, as well as by use of the authentication encryption key D11 previously stored in the internal memory 32. The authentication CPU 31 further sends the decrypted registered pattern data D13 to the authentication section 38.

Thus, when obtaining registered pattern data D13 registered in the card terminal 2x, the authentication CPU 31 exchanges the authentication encryption key D11 and terminal encryption key D12 with the card terminal 2x. By use of these encryption keys D11 and D12, the authentication CPU 31 lets the card terminal 2x transmit the registered pattern data D13 encrypted double. Therefore, the authentication CPU 31 securely prevents fraudulent use during transmission of the registered pattern data D13, and so can strengthen security.

The authentication section 38 compares the registered pattern data D13 with the data D10 of a blood vessel formation pattern extracted by the pattern 37. If level of agreement between the blood vessel formation patterns expressed by the data D10 and D13 is equal to or higher than a predetermined threshold value, the authentication section 38 determines the target as being the person identical to the registrant. Otherwise, if the level is lower than the threshold value, the target is determined as being a third person.

(1-6) Authentication Processing Procedure

Figure 6:
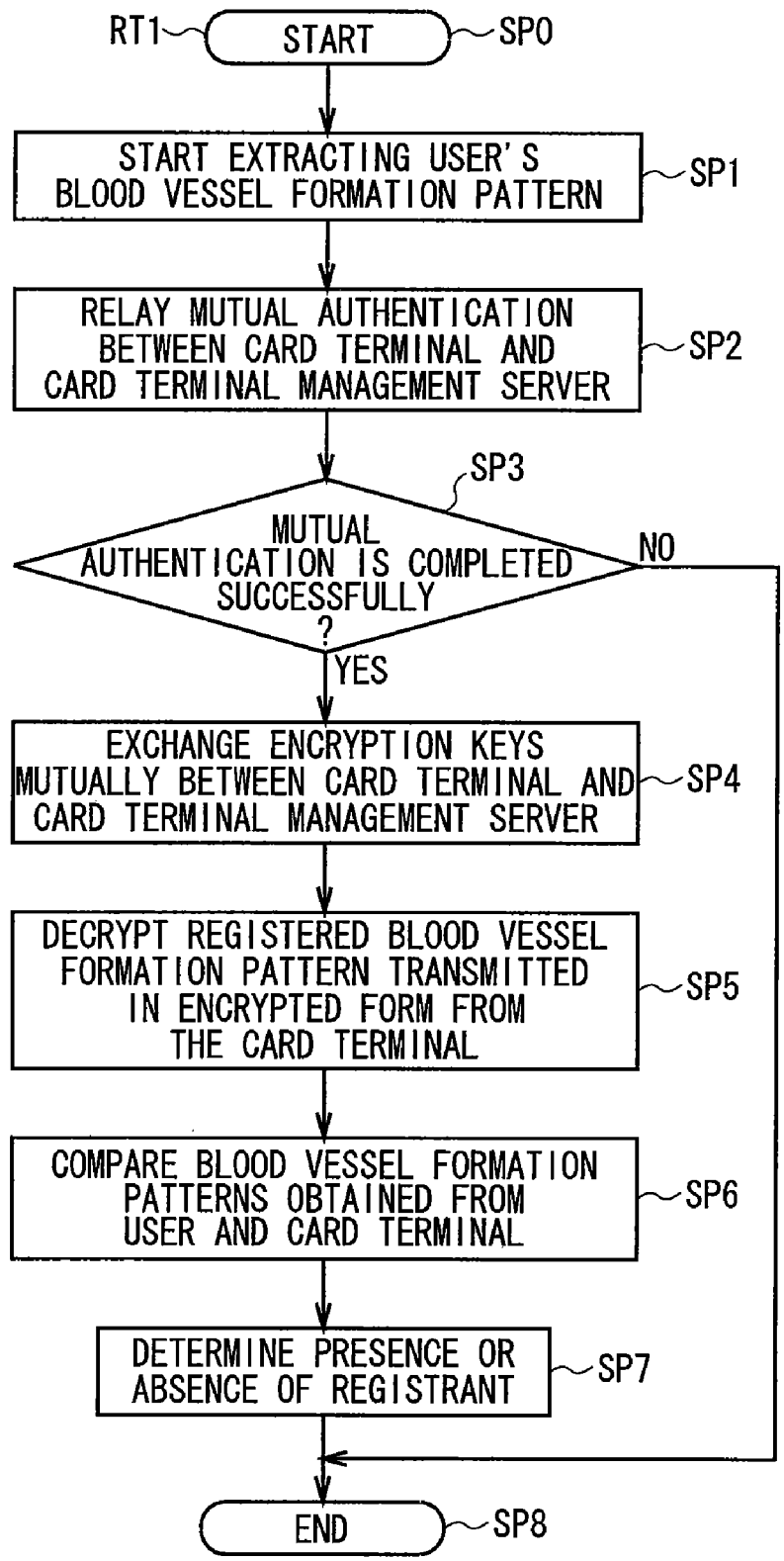
FIG. 6 is a flowchart showing a first authentication processing procedure.

A series of relay processing and biological authentication processing for mutual authentication (hereinafter called a first authentication processing) by the authentication CPU 31 is carried out along the first authentication processing procedure RT1 shown in FIG. 6.

That is, the authentication CPU 31 receives startup notification data D1 from a card terminal 2x brought close to the approach face 3A. Then, the authentication CPU 31 starts the first authentication processing procedure RT1 in step SP0. In subsequent step SP1, the authentication CPU 31 starts up the biological information read section LIR (FIG. 2), and starts extraction of a blood vessel formation pattern existing in fingers of the hand grasping the card terminal 2x.

The authentication CPU 31 further relays mutual authentication between the card terminal 2x and the card terminal management server 4 in step SP2. In subsequent step SP3, the authentication CPU 31 determines whether or not the mutual authentication is completed successfully based on management determination data D5 and terminal determination data D8 supplied from the card terminal 2x and card terminal management server 4.

If the mutual authentication is determined to be completed successfully, the authentication CPU 31 sends its own authentication encryption key D11 (FIG. 5) to the card terminal 2x in next step SP4. At the same time, the authentication CPU 31 obtains a terminal encryption key D12 maintained in the card terminal 2x (FIG. 5) from this card terminal 2x. In subsequent step SP5, the authentication CPU 31 uses the authentication encryption key D11 and terminal encryption key D12, to decrypt the registered blood vessel formation pattern D13 transmitted in double encrypted form from the card terminal 2x.

Further in next step SP6, the authentication CPU 31 compares a user's blood vessel formation pattern by the startup in step SP1 with another registered blood vessel formation pattern expressed by the registered blood vessel formation pattern D13 decrypted in step SP5. In subsequent step SP7, the authentication CPU 31 determines presence or absence of the person identical to the registrant, based on the comparison result. Thereafter, the authentication CPU 31 goes to step SP8 and terminates the first authentication processing procedure RT1.

Otherwise, if the mutual authentication is determined to have failed, the authentication CPU 31 goes to step SP8 and terminates the first authentication processing procedure RT1, without executing the processings of steps SP4 to SP7.

Thus, the authentication CPU 31 is configured to be capable of executing the first authentication processing.

(1-7) Operation and Effects of the First Embodiment

With the configuration as described above, the authentication device 3 of the information processing system 1 communicates with the card terminal 2x which has been brought close to the approach face 3A (FIG. 3) among plural card terminals 2i (FIG. 1), and obtains registered pattern data D13 maintained in the card terminal 2x.

On the other side, the authentication device 3 picks up an image of the hand grasping the card terminal 2x brought close to the approach face 3A, to extract a blood vessel formation pattern from this imaging result.

Further, the authentication device 3 authenticates whether the user who has brought the card terminal 2x close to the approach face 3A is the registrant of the registered blood vessel formation pattern maintained in the card terminal 2x, based on these blood vessel formation patterns.

Therefore, the authentication device 3 can avoid a processing of reading and comparing blood vessel formation patterns in an arbitrary order from a database in the authentication device 3. Accordingly, time required for the comparison can be remarkably reduced, compared with another case where all the blood vessel formation patterns stored respectively in the plural card terminals 2i are registered as a database in the authentication device 3.

In this case, the blood vessel formation pattern is maintained in the card terminal 2x. Therefore, the authentication device 3 can more securely avoid fraudulent use of blood vessel formation patterns registered in the database, compared in another case where blood vessel formation patterns are registered as a database in the authentication device 3. Accordingly, reliability of the blood vessel formation pattern can improve.

Also, the authentication device 3 relays mutual authentication between the card terminal 2x and the card terminal management server 4. If the mutual authentication is determined to be completed successfully, the authentication device 3 executes biological authentication. In this manner, the authentication device 3 can avoid masquerading that a registered blood vessel formation pattern is fraudulently used and maintained in a counterfeit card terminal. Therefore, security can be much more strengthened.

According to the configurations as described above, a registered blood vessel formation pattern D13 maintained in the card terminal 2x which has been brought close to the approach face 3A among plural card terminals 2i and another blood vessel formation pattern extracted from the user grasping the card terminal 2x are compared with each other. As a result, comparison processings can be lightened compared with a case where all the blood vessel formation patterns respectively stored in the plural card terminals 2i (FIG. 1) are registered as a database in the authentication device 3. Accordingly, user's waiting time can be shortened owing to the lightened comparison processings, and thus, usability can improve.

Figure 7:
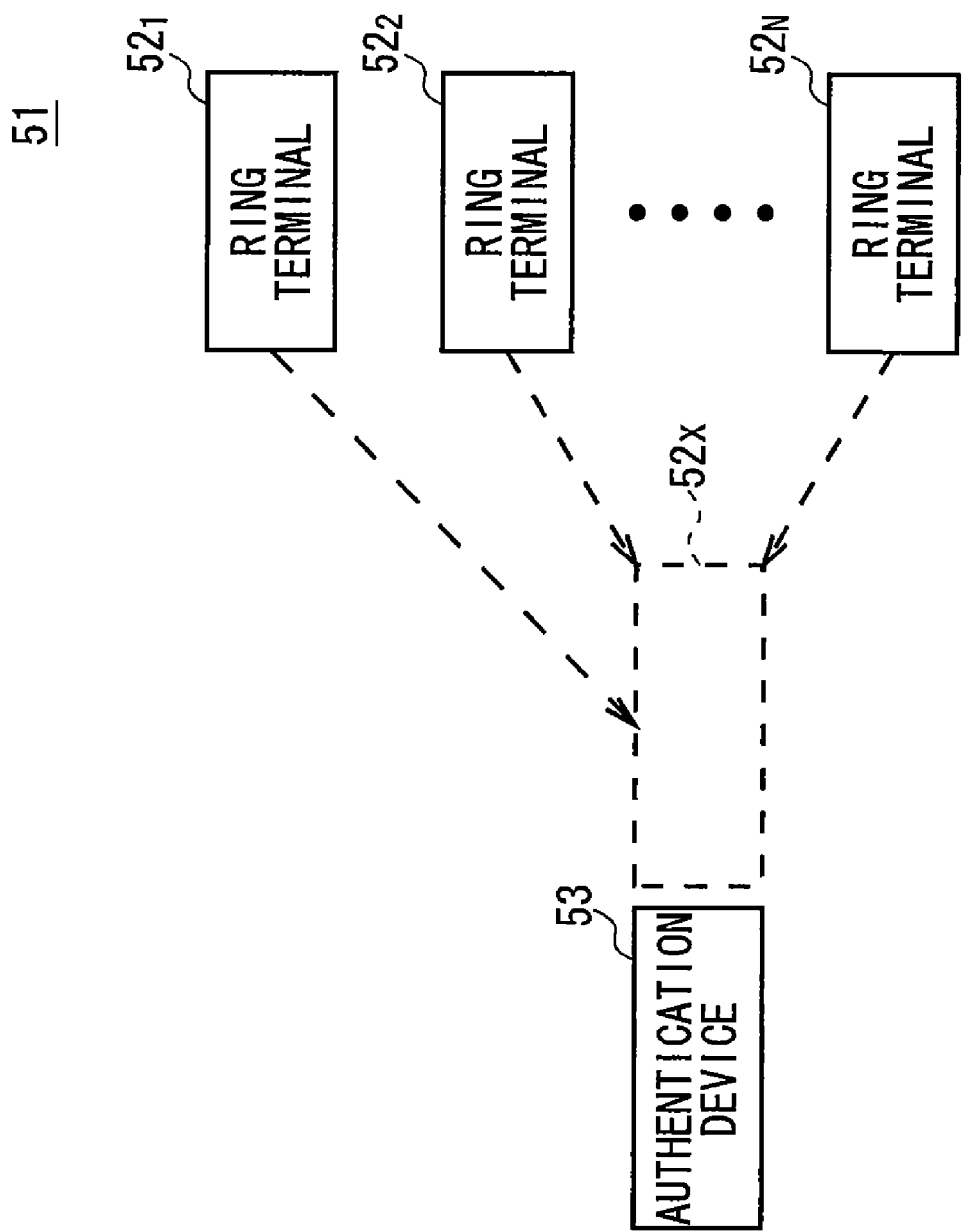
FIG. 7 is a schematic diagram showing the entire configuration of the information processing system according to a second embodiment.

(2) Second Embodiment (2-1) Entire Configuration of an Information Processing System According to the Second Embodiment In FIG. 7, a reference numeral 51 denotes, as a whole, the information processing system according to the second embodiment, which is constituted by plural terminal devices (hereinafter called ring terminals) 52i (where i=1, 2, . . . , N) each having a ring-like shape, and an authentication device 53.

The ring terminals 52i have been respectively distributed to users as targets for whom predetermined services are provided. Each of the ring terminals 52i maintains an inherent terminal ID as data to identify registered blood vessel formation pattern data registered in the authentication device 53.

On the other side, the authentication device 53 manages terminal IDs respectively maintained in the ring terminals 52i and registered blood vessel pattern data which are compiled in a database. Based on the registered blood vessel pattern data, whether or not a user who is going to receive a service is the identical person to a registrant. Although this information processing system 51 exemplifies a case of placing one authentication device 53, plural authentication devices 53 may be placed at predetermined placement locations.

When a service is provided by this information processing system 51, a user brings a part wearing a ring terminal 52x (x=1, 2, . . . , or N) near to a predetermined position of the authentication device 53. In this case, the authentication device 53 performs terminal authentication (mutual authentication) with the ring terminal 52x, based on a terminal ID, and obtains a blood vessel formation pattern of blood vessels existing in the wearing part to which the ring terminal 52x has been brought close.

If the terminal authentication (mutual authentication) is completed successfully, the authentication device 53 specifies corresponding registered blood vessel pattern data from the database, based on the terminal ID of the ring terminal 52x. The authentication device 53 compares a blood vessel formation pattern expressed by the specified registered blood vessel pattern data and another blood vessel formation pattern obtained from the user with each other, thereby to determine presence or absence of the person identical to the registrant.

Thus in this information processing system 51, if only the ring terminal 52x is brought close to the authentication device 53, the authentication device 53 automatically obtains a blood vessel formation pattern of the user who wears the ring terminal 52x at this time, and compares this pattern with another blood vessel formation pattern maintained in the database.

In this case, the authentication device 53 performs comparison after specifying a corresponding registered blood vessel formation pattern among plural blood vessel formation patterns registered in the database, based on the terminal ID used for terminal authentication (mutual authentication). Therefore, processing load thereof can be remarkably reduced compared with another case of reading and comparing one after another of blood vessel formation patterns in an arbitrary order from a database. As a result of this, user waiting time can be remarkably reduced.

In this information processing system 51, a management mechanism for registered blood vessel pattern data is provided in the authentication device 53, and data (terminal ID) for identifying corresponding registered blood vessel pattern data among the managed registered blood vessel pattern data is registered in the card terminals 52i. In this respect, this system differs from the information processing system 1 (FIG. 1) in which registered blood vessel formation pattern data are registered in individual card terminals 2i without providing a management function of the registered blood vessel pattern data.

Therefore, this information processing system 51 has relatively high possibility of fraudulent use of registered blood vessel pattern data in the database due to the manager of the authentication device 53, compared with the information processing system 1. On the contrary, possibility of fraudulent use of registered blood vessel pattern data from the card terminals 52i steadily becomes zero.

The information processing system 51 has a style that the terminal authentication function and the biological authentication function are all entrusted to the authentication device 53. This style is particularly useful in case of constructing a relatively small scale system such as SOHO, compared with another style of the information processing system 1 (FIG. 1) in which the terminal authentication function and the biological authentication function are separately entrusted to the card terminal management server 4 and the authentication device 3, respectively.

(2-2) Structures of the Ring Terminal and the Authentication Device

Figure 8:
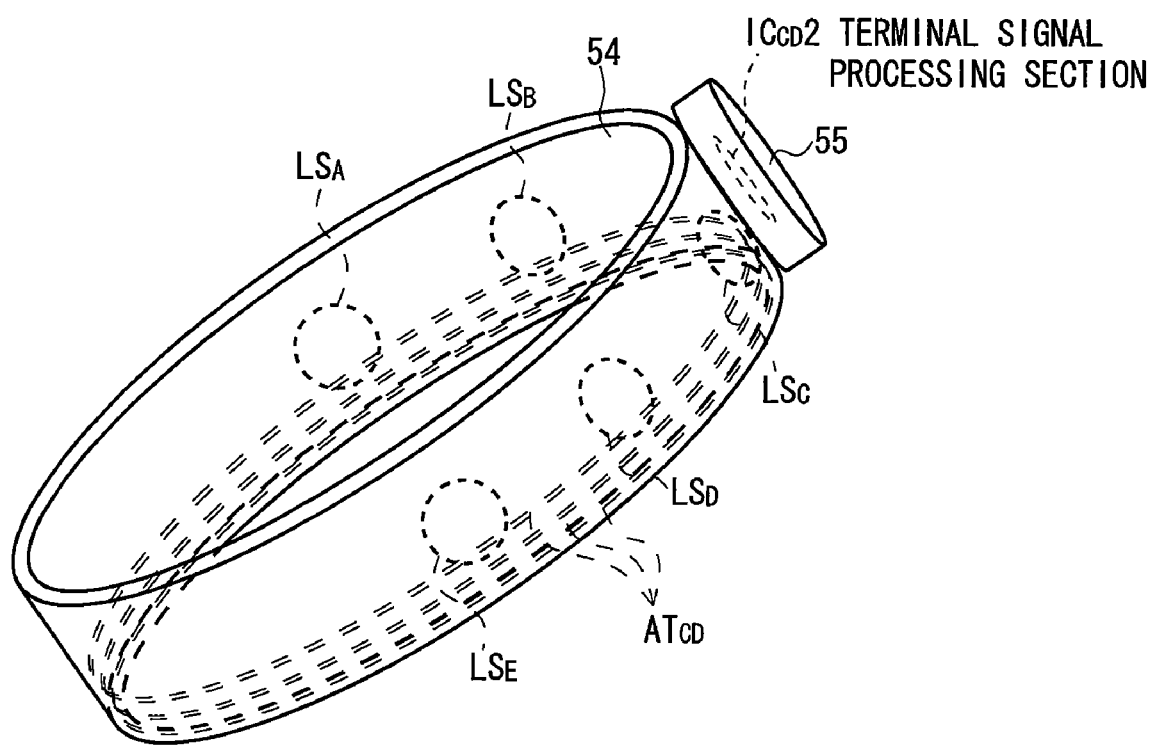
FIG. 8 is a schematic diagram showing the structure of a ring terminal.
Figure 9:
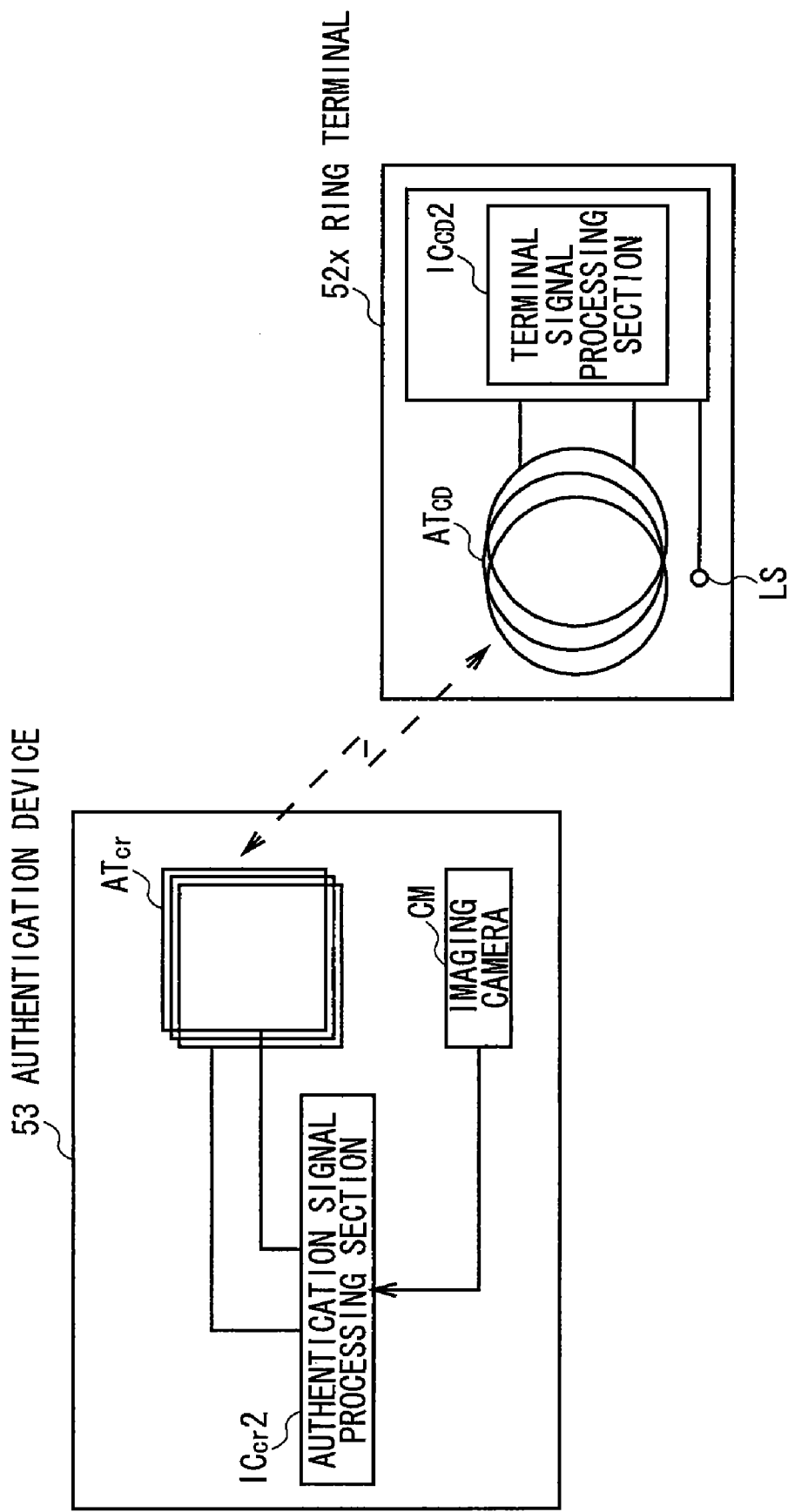
FIG. 9 is a schematic diagram showing configurations of the ring terminal and an authentication device (1).

Structures of the ring terminal 52x and the authentication device 53 will now be described below. As shown in FIG. 8 in which parts corresponding to parts in the first embodiment are denoted by the same reference symbols, the ring terminal 52x is constituted by a ring portion 54 and an ornament portion 55 provided on the outer circumferential surface of the ring portion 54. The ring portion 54 allows the ring terminal 52x to be attached to and detached from a finger.

Inside the ring portion 54, a terminal antenna $AT_{CD}$ having a shape corresponding to the shape of the ring portion 54 is contained. On the inner circumferential surface of the ring portion 54, plural near infrared light sources LS ($LS_A$ to $LS_D$) are provided near the ornament portion 55. The terminal antenna $AT_{CD}$ and the near infrared light sources LS are connected to a terminal signal processing section $IC_{CD}$2 contained in the ornament portion 55.

When an electromagnetic induction signal supplied from the authentication device 53 is received through the terminal antenna $AT_{CD}$, the terminal signal processing section $IC_{CD}2$ starts up, using as a drive voltage a voltage induced in response to the signal received. The terminal signal processing section $IC_{CD}2$ exchanges various data with the authentication device 53 by use of a terminal ID maintained in advance, to perform mutual authentication, and is configured to be able to drive and control the near infrared light source LS. Specific contents of processings of the terminal signal processing section $IC_{CD}2$ will be described later.

Meanwhile, the authentication device 53 has the same structure as the authentication device 3 in the first embodiment except the following points. One of the points is that the near infrared light source LS provided on the approach face 3A is omitted (although substitutions are provided on the terminal side), compared with the authentication device 3 in the first embodiment. The other point is that an authentication signal processing section $IC_{cr}2$ is provided in place of the authentication signal processing section $IC_{cr}1$.

More specifically, the authentication signal processing section $IC_{cr}2$ has a difference in that a mutual authentication processing to perform mutual authentication directly with the ring terminal 52x is provided in place of the mutual authentication relay processing in the authentication signal processing section $IC_{cr}1$. Another difference is that a biological authentication processing (hereinafter called a double biological authentication processing) to determine presence or absence of the person identical to a registrant by use of two methods is provided in place of the biological authentication processing in the authentication signal processing section $IC_{cr}1$.

Figure 11:
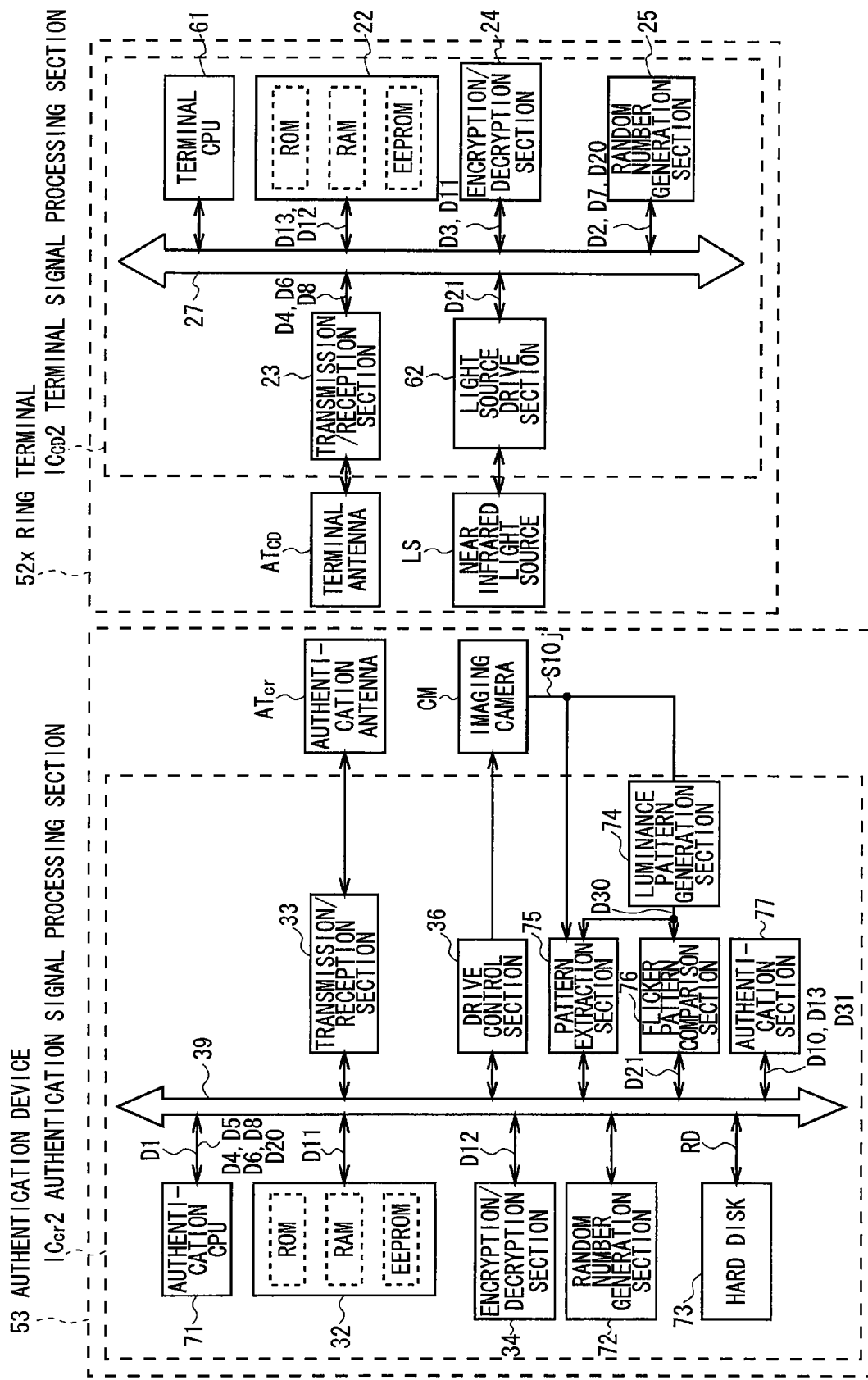
FIG. 11 is a schematic diagram showing specific circuit configurations of a terminal signal processing section and an authentication processing section according to the second embodiment.

The mutual authentication processing and the double biological authentication processing mentioned above will now be described in details with reference to FIG. 11 in which parts corresponding to parts in FIG. 5 are denoted by the same reference symbols.

(2-3) Mutual Authentication Processing

When an electromagnetic induction signal supplied from the authentication device 3 is received through the terminal antenna $AT_{CD}$, the terminal CPU 61 of the ring terminal 52x starts up, using as a drive voltage a voltage induced in response to the signal received. As has been described in the first embodiment, the terminal CPU 61 transmits startup notification data D1 to the authentication device 53 sequentially through the terminal antenna $AT_{CD}$ and the transmission/reception section 23. Thereafter, the terminal CPU 61 generates encrypted random number pattern data D4 and transmits the data D4 to the authentication device 53.

An authentication CPU 71 in the authentication device 3 receives the startup notification data D1 supplied from the ring terminal 52x, sequentially through the authentication antenna $AT_{cr}$ and the transmission/reception section 33. Thereafter, the authentication CPU 71 waits for the encrypted random number pattern data D4 supplied from the ring terminal 52x.

When the encrypted random number pattern data D4 is received, the authentication CPU 71 performs, through the encryption/decryption section 34, a predetermined decryption processing thereon by use of the same key information as the card terminal 2x maintained in advance. Thereafter, through a random number generation section 72, the authentication CPU 71 performs a back-diffusion processing on the decryption result, and as a further result, obtains the terminal ID (seed data D2a) of the ring terminal 52x.

In this state, if this terminal ID is found in the database of a hard disk 73, the authentication CPU 71 determines the current communication partner to be the ring terminal 52x. Otherwise, if the terminal ID does not exist in the database, the authentication CPU 71 determines the current communication partner as masquerading the ring terminal 52x, and stores temporarily the determination result as management determination data D5 in the internal memory 32.

Also, the authentication CPU 71 diffuses, through the random number generation section 72, the terminal ID again by diffusion data corresponding to the diffusion data D2b in the ring terminal 52x. Thereafter, the authentication CPU 71 performs, through the encryption/decryption section 34, an encryption processing on the diffusion result by use of key information. The authentication CPU 71 then transmits encrypted random number pattern data D6 obtained as a result of the encryption processing, to the ring terminal 52x sequentially through the transmission/reception section 33 and the authentication antenna $AT_{cr}$.

A terminal CPU 61 of the ring terminal 52x performs various processings on the encrypted random number pattern data D6, like in the first embodiment. If a terminal ID expressed by seed data D7 obtained as a result agrees with the own terminal ID of the ring terminal 52x, the terminal CPU 61 of the ring terminal 52x determines that the current communication partner to be the authentication device 53. Otherwise, if the terminal ID does not agree with the own terminal ID, the terminal CPU 61 determines the current communication partner as masquerading the authentication device 53, and transmits the determination result as terminal determination data D8 to the authentication device 53 sequentially through the transmission/reception section 23 and the terminal antenna $AT_{CD}$.

Thus, the authentication CPU 71 of the authentication device 53 can obtain the management determination data D5 and the terminal determination data D8 each as a result of terminal authentication (mutual authentication) with the ring terminal 52x.

(2-4) Biological Authentication Processing

Described next will be a double biological authentication processing.

In actual, when startup notification data D1 supplied from the ring terminal 52x is received, the authentication CPU 71 generates seed data D20a and diffusion data D20b. Further, through the encryption/decryption section 34, the authentication CPU 71 performs a predetermined encryption processing on the seed data D20a and diffusion data D20b by use of key information maintained in advance. The authentication CPU 71 transmits the encrypted seed data D20a and diffusion data D20b to the ring terminal 52x sequentially through the transmission/reception section 33 and the authentication antenna $AT_{cr}$.

On the other side, the terminal CPU 61 of the ring terminal 52x receives the encrypted seed data D20a and diffusion data D20b sequentially through the terminal antenna $AT_{CD}$ and the transmission/reception section 23. Then, through the encryption/decryption section 24, the terminal CPU 61 performs a decryption processing on the encrypted seed data D20a and diffusion data D20b.

Further, the terminal CPU 61 diffuses the encrypted seed data D20a by the diffusion data D20b, through the random number generation section 25, to generate data D21 of a flicker pattern (hereinafter called flicker pattern data) consisting of "1" and "0" respectively indicating lighting ON and OFF of the near infrared light sources LS.

In this state, through a light source drive section 62, the terminal CPU 61 lets the near infrared light sources LS flicker based on the flicker pattern data D21. Simultaneously, through the encryption/decryption section 24, the terminal CPU 61 performs an encryption processing on the flicker pattern data D21 by use of a secret key, and transmits the encrypted flicker pattern data D21 to the authentication device 53 sequentially through the transmission/reception section 23 and the terminal antenna $AT_{CD}$.

When the encrypted flicker pattern data D21 is received from the ring terminal 52x sequentially through the authentication antenna $AT_{cr}$ and the transmission/reception section 33, the authentication CPU 71 decrypts the encrypted flicker pattern data D21 by means of the encryption/decryption section 34, and sends the flicker pattern data D21 obtained as a result, to a flicker pattern comparison section 76.

The authentication CPU 71 also controls the imaging camera CM, to pick up an image of blood vessels inside fingers wearing the ring terminal 52x which has been brought close to the approach face 3A (FIG. 10) at this time.

Figure 10:
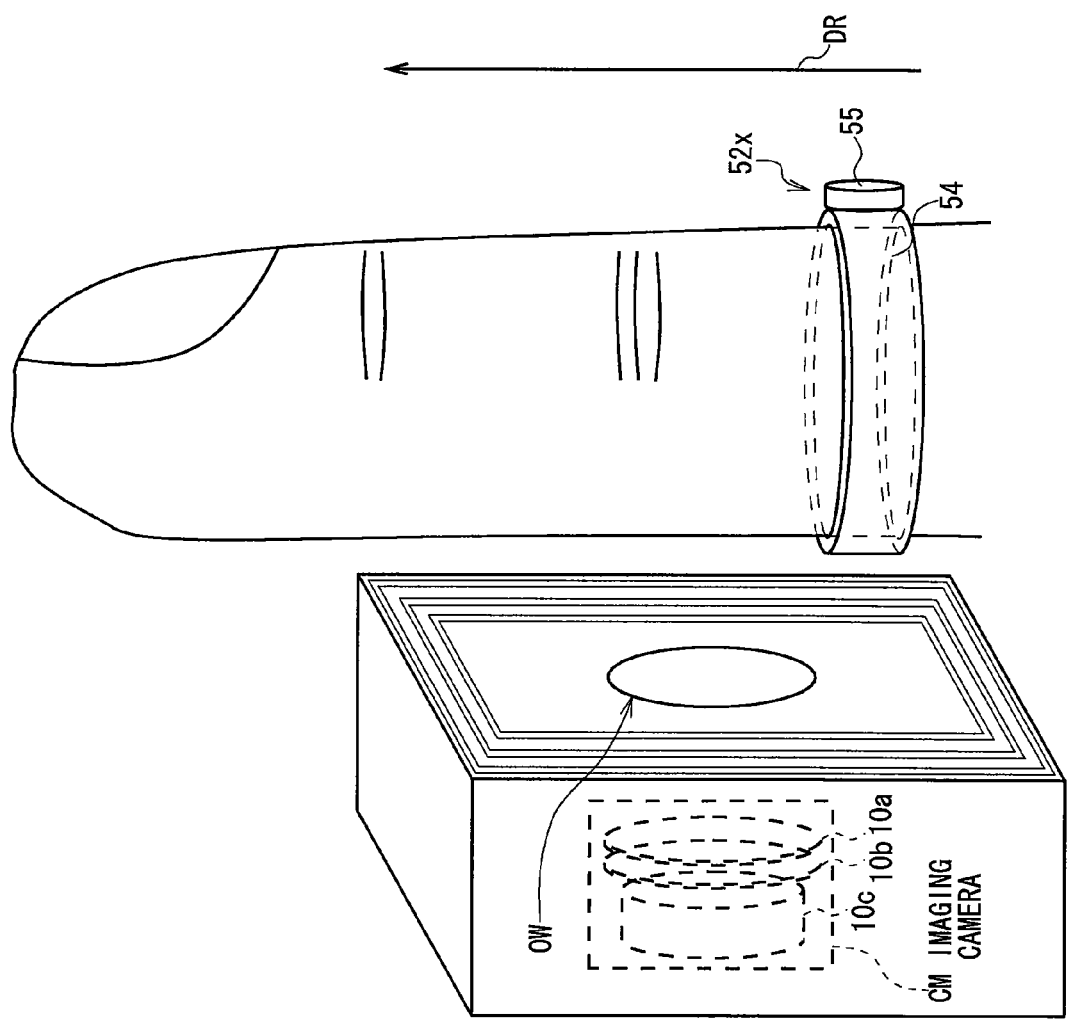
FIG. 10 is a schematic diagram showing a configuration of the ring terminal and authentication device (2).

In case of this embodiment, the hand wearing the ring terminal 52x and the approach face 3A are configured to be situated close to each other with a predetermined positional relationship kept therebetween. For example, as shown in FIG. 10, the ring terminal 52x is put on such that the ornament portion 55 is opposed to the back of a predetermined finger. The ring terminal 52x and the face 3A approach each other with the finger pad of the predetermined finger kept parallel to the approach face 3A and opposed from a predetermined direction DR.

Alternatively, the hand may be actively moved close to the approach face 3A or passively moved by a member (not shown) to locate the hand to a predetermined position.

Figure 12:
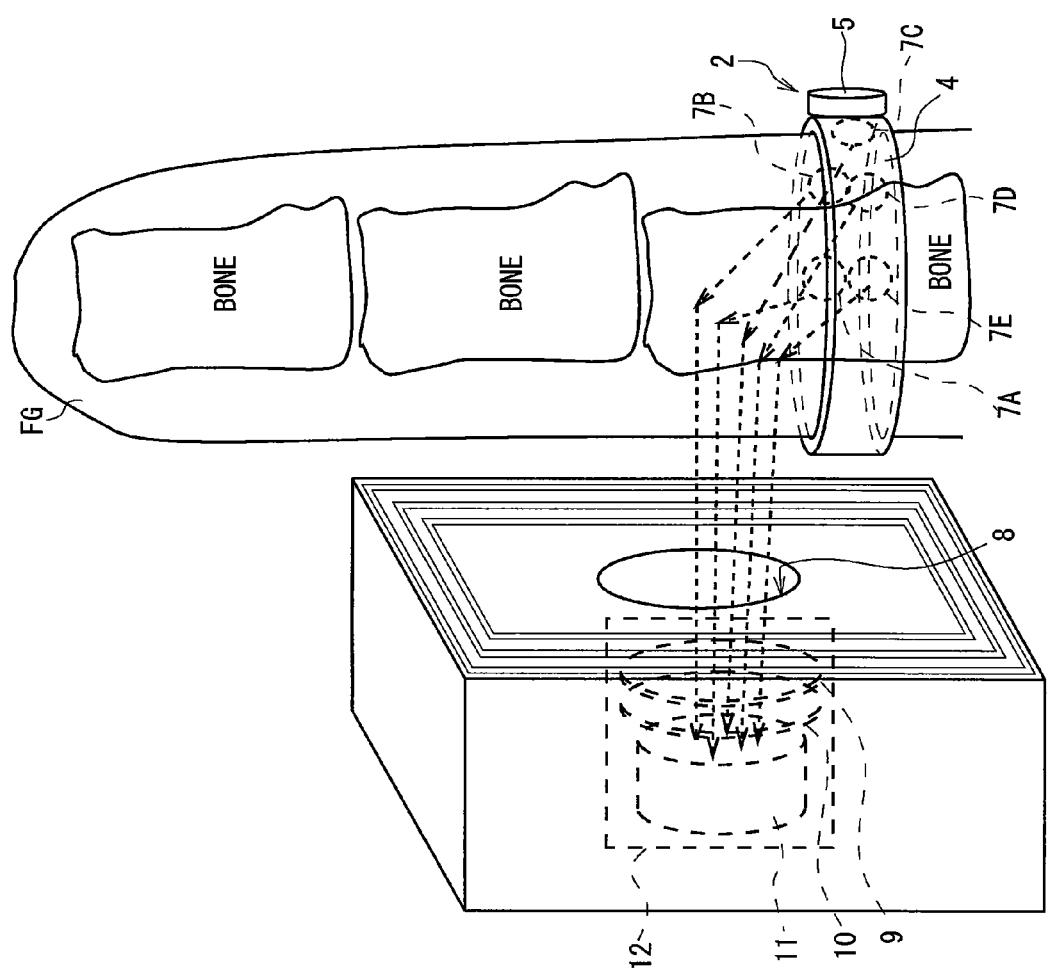
FIG. 12 is a schematic diagram showing light paths of near infrared light (2).

When the hand wearing ring terminal 52x is thus put close to the approach face 3A, near infrared light emitted from the near infrared light sources LS of the ring terminal 52x is emitted on the finger wearing the ring terminal 52x, as indicated by broken lines in FIG. 12. The near infrared light is absorbed by hemoglobin flowing in the blood vessels existing in the finger, and is scattered and reflected by tissue other than the blood vessels. The light then goes out of the fingers. This outgoing near infrared light is obtained as blood vessel projection light. This blood vessel projection light runs from the open window OW sequentially through the imaging lens 10a of the imaging camera CM, diaphragm (not shown), and near infrared light pass filter 10b, and enters into the solid state imaging element 10c. This light is sent as a brood vessel image signal S10j (j=1, 2, . . . , m) to a luminance pattern generation section 74 and a pattern extraction section 75.

The luminance pattern generation section 74 detects changes in the state of luminance in the blood vessel image signal S10j. The state of brightness in the blood vessel image signal S10j corresponds to the flicker pattern of the near infrared light sources LS. Therefore, a dark state is given when the near infrared light source LS are lightened off. On the other side, a bright state is given when the near infrared light sources LS are lightened on.

Further, based on a detection result as described above, the luminance pattern generation section 74 generates pattern (hereinafter called a luminance pattern) data D30 consisting of "1" and "0" respectively indicative of a bright state in which the luminance of the blood vessel image signal S10j is high and a dark state in which the luminance is low. The luminance pattern generation section 74 sends the data D30 to the pattern extraction section 75 and the flicker pattern comparison section 76.

The pattern extraction section 75 performs various processings such as an A/D (Analog/Digital) conversion processing, a blood vessel linearization processing, and the like, on the blood vessel image signal S10j supplied from the imaging camera CM. Thereafter, the pattern extraction section 75 performs a binarization processing thereon to generate data of a binary blood vessel image.

Based on the luminance pattern data D30 supplied from a luminance pattern generation section 76, the pattern extraction section 75 further selects one binary blood vessel image corresponding to a turned-off state of the near infrared light sources LS. From the binary blood vessel image, the pattern extraction section 75 extracts characteristic points such as branch points and the like, and sends data D10 of a blood vessel formation pattern obtained as a result, to the authentication section 77.

The flicker pattern comparison section 76 compares the flicker pattern data D21 supplied from the ring terminal 52x with the state of the luminance pattern data D30 supplied from the luminance pattern generation section 74 (an array state of "1" and "0"), thereby to detect crafty masquerading of, for example, irradiating near infrared light on a film of a blood vessel formation pattern or the like.

Further, if this comparison results in agreement, the flicker pattern comparison section 76 determines that no masquerading has been conducted. Otherwise, if the comparison results in disagreement, the flicker pattern comparison section 76 determines that masquerading has been conducted. The flicker pattern comparison section 76 sends this determination result as flicker pattern determination data D31 to the authentication section 77.

On the other side, if determination results of the terminal determination data D8 and the management determination data D5 which are obtained from mutual authentication with the ring terminal 52x express successful authentication of each other, the authentication CPU 71 performs, through the encryption/decryption section 34, a predetermined encryption processing on an authentication encryption key D11 stored in advance in the internal memory 32, by use of a secret key. The authentication CPU 71 transmits the authentication encryption key D11 thus encrypted, to the ring terminal 52x sequentially through the transmission/reception section 33 and authentication antenna $AT_{cr}$.

The terminal CPU 61 of the ring terminal 52x receives the encrypted authentication encryption key D11 sequentially through the transmission/reception section 23 and the terminal antenna $AT_{CD}$. Then, through the encryption/decryption section 24, the terminal CPU 61 performs a predetermined encryption processing on a terminal encryption key D12 stored in advance in the internal memory 22, by use of a secret key. The terminal CPU 21 transmits the encrypted terminal encryption key D12 to the authentication device 53 sequentially through the transmission/reception section 23 and the terminal antenna $AT_{CD}$.

Also, the terminal CPU 61 performs, through the encryption/decryption section 24, a predetermined decryption processing on the authentication encryption key D11, by use of a secret key. Further, the terminal CPU 61 encrypts the terminal ID registered in the EEPROM in the internal memory 22, by use of the decrypted authentication encryption key D11. Simultaneously, the terminal CPU 61 encrypts the terminal ID encrypted by the authentication encryption key D11, further by use of the terminal encryption key D12. The terminal CPU 61 transmits the terminal ID thus encrypted double to the authentication device 53 sequentially through the transmission/reception section 23 and the terminal antenna $AT_{CD}$.

The authentication CPU 71 of the authentication device 53 receives the encrypted terminal encryption key D12 sequentially through the authentication antenna $AT_{cr}$ and the transmission/reception section 33. The authentication CPU 71 then performs, through the encryption/decryption section 34, a predetermined decryption processing on the encrypted terminal encryption key D12 by use of a secret key.

The authentication CPU 71 also waits for double encrypted terminal ID which is to be transmitted thereafter from the ring terminal 52x. Further, the authentication CPU 71 receives the double encrypted terminal ID. Then, the authentication CPU 71 decrypts the terminal ID by use of the decrypted terminal encryption key D12, as well as by use of the authentication encryption key D11 stored in advance in the internal memory 32. The authentication CPU 71 further sends the decrypted terminal ID to the authentication section 77.

Thus, the authentication section 77 is inputted with each of the terminal ID, the flicker pattern determination data D31 supplied from the flicker pattern comparison section 76, and the data D10 of a blood vessel formation pattern supplied from the pattern extraction section 75.

If the determination result of the flicker pattern determination data D31 indicates that there is no masquerading, the authentication section 77 searches the database for registered blood vessel formation pattern data corresponding to the terminal ID, and reads the registered blood vessel formation pattern data RD corresponding to the terminal ID, from the hard disk 73.

The authentication section 77 further determines presence or absence of the person identical to the registrant, based on the registered blood vessel formation pattern data RD read from the hard disk 73 and data D10 of a blood vessel formation pattern supplied from the pattern extraction section 75, to determine presence or absence of a registrant.

(2-5) Authentication Processing Procedure

Figure 13:
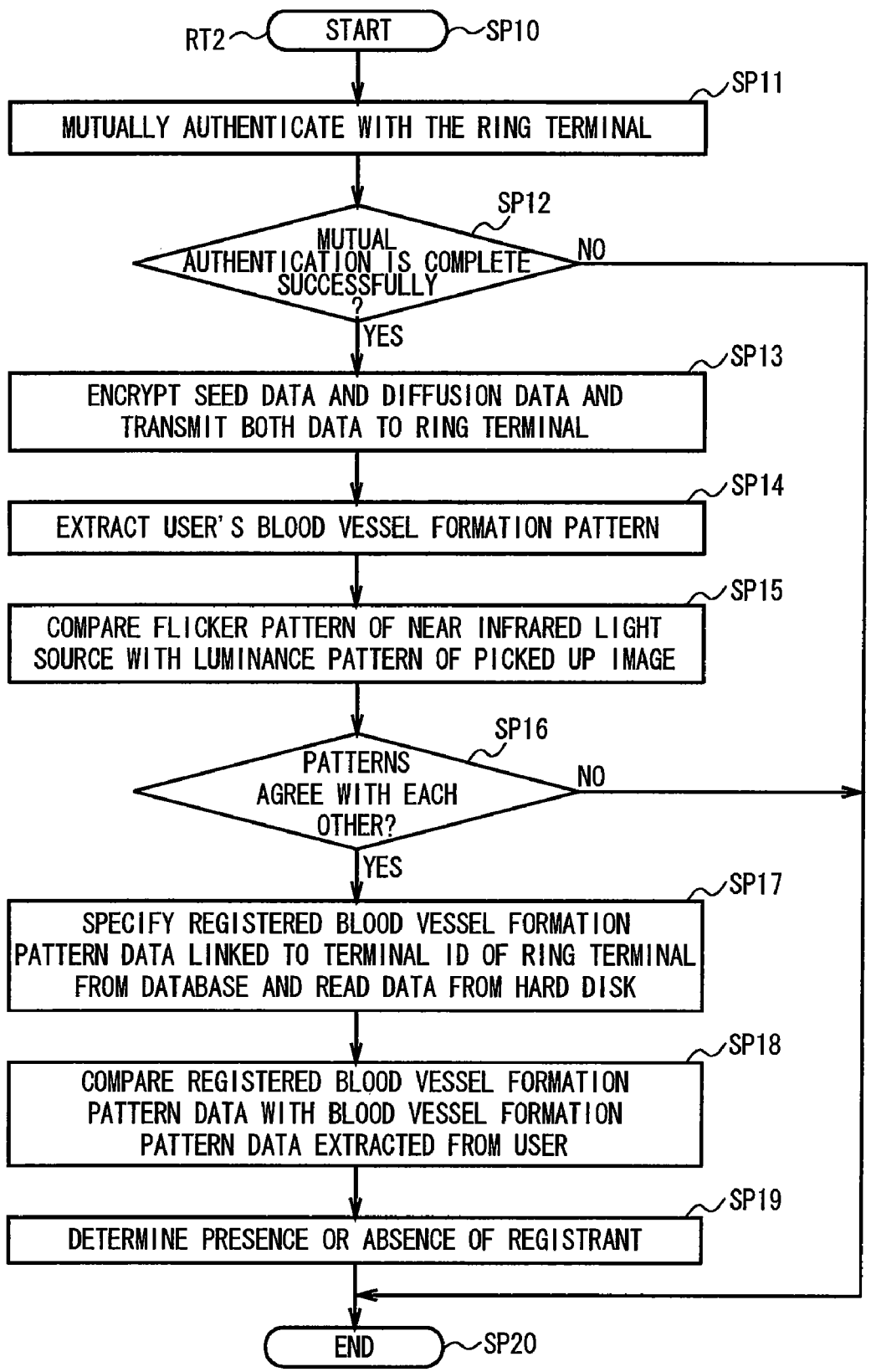
FIG. 13 is a flowchart showing a second authentication processing procedure.

A series of mutual authentication processing and double biological authentication processing (hereinafter called a second authentication processing) by the authentication CPU 71 is carried out along the second authentication processing procedure RT2 shown in FIG. 13.

That is, the authentication CPU 71 receives startup notification data D1 (FIG. 11) from a ring terminal 52x brought close to the approach face 3A. Then, the authentication CPU 71 starts the second authentication processing procedure RT2 in step SP10. In subsequent step SP11, the authentication CPU 71 executes a mutual authentication processing with the ring terminal 52x. In further subsequent step SP12, the authentication CPU 71 determines whether mutual authentication is completed successfully, based on management determination data D5 obtained as a result of the mutual authentication processing and on the terminal determination data D8.

If the mutual authentication is determined to be completed successfully, the authentication CPU 71 transmits predetermined seed data D20a and diffusion data D20b (FIG. 11) in encrypted form to the ring terminal 52x, in next step SP13. In this case, the ring terminal 52x generates flicker pattern data D21 (FIG. 11), based on the seed data D20a and diffusion data D20b. The flicker pattern data D21 is sent, in the encrypted form, to the authentication device 53, and the near infrared light sources LS (FIG. 12) are flickered based on the flicker pattern data D21.

Next, in step SP14, the authentication CPU 71 starts up the imaging camera CM (FIG. 12), and extracts a blood vessel formation pattern existing inside a finger of the hand wearing the ring terminal 52x, based on an imaging result (blood vessel image signal S10j) of the imaging camera CM.

In next step SP15, the authentication CPU 71 further compares a flicker pattern expressed by the flicker pattern data D21 transmitted from the ring terminal 52x with the luminance pattern of the blood vessel image signal S10j picked up by the imaging camera CM. In subsequent step SP16, if the flicker pattern and the luminance pattern are determined to agree with each other, the procedure goes to step SP17.

In this step SP17, the authentication CPU 71 specifies, from a database, registered blood vessel formation pattern data RD which has been associated with the terminal ID of the ring terminal 52x obtained at the time of mutual authentication in step SP11. The authentication CPU 71 reads the registered blood vessel formation pattern data RD corresponding to the terminal ID, from the hard disk 73.

Further, in next step SP18, the authentication CPU 71 compares a blood vessel formation pattern expressed by the registered blood vessel formation pattern data RD with another blood vessel formation pattern extracted from the user in step SP14. In subsequent step SP19, the authentication CPU 71 determines presence or absence of the person identical to the registrant, based on the comparison result. Thereafter, the authentication CPU 71 goes to a next step SP20 and terminates the second authentication processing procedure RT2.

Otherwise, if the mutual authentication is determined to have failed in step SP12 or if the flicker pattern and the luminance pattern are determined to disagree with each other in step SP16, access is obviously from a third person other than the registrant. Therefore, the authentication CPU 71 goes to step SP20 and terminates the second authentication processing procedure RT2, without unnecessarily determining presence or absence of the person identical to the registrant in step SP19.

The authentication CPU 71 is configured to execute the second authentication processing procedure RT2 in the above-described manner.

(2-6) Operation and Effects of the Second Embodiment

With the configuration as described above, the authentication device 53 of the information processing system 51 communicates with the ring terminal 52x which has been brought close to the approach face 3A (FIG. 10) among plural ring terminals 52i (FIG. 7), and performs mutual authentication therewith, to obtain a terminal ID maintained in the ring terminal 52x.

If the mutual authentication is completed successfully, the authentication device 53 compares a blood vessel formation pattern expressed by registered blood vessel formation pattern data RD corresponding to the terminal ID with another blood vessel formation pattern extracted from the blood vessel image signal S10j, to determine presence or absence of a registrant.

Therefore, the authentication device 53 can avoid a processing of reading and comparing blood vessel formation patterns in an arbitrary order from a database in the authentication device 3. Accordingly, the comparison time can be remarkably reduced.

While performing the mutual authentication, the authentication device 53 flickers the near infrared light sources LS of the ring terminal 52x according to a predetermined flicker pattern, irradiating the hand wearing the ring terminal 52x brought close to the approach face 3A, and picks up an image of the hand. Further, if the mutual authentication is completed successfully, the authentication device 53 compares the flicker pattern of having flickered the near infrared light sources LS, with the luminance pattern of the blood image signal S10$j$ obtained as an imaging result. In accordance with a result of the comparison, the authentication device 53 determines presence or absence of a registrant, based on blood vessel formation patterns.

Therefore, the authentication device 53 can double check masquerading of a third person as the registrant, from different viewpoints, and so can avoid crafty masquerading. Hence, security can be strengthened much more.

According to the configurations as described above, corresponding registered blood vessel formation pattern data RD is specified among plural registered blood vessel formation pattern data, using the terminal ID obtained by mutual authentication as an identifier of registered blood vessel formation pattern data. Based on a blood vessel formation pattern expressed by the registered blood vessel formation pattern data RD and another blood vessel formation pattern extracted from the blood vessel image signal S10$j$, presence or absence of a registrant is determined. As a result of this, a processing of reading and comparing blood vessel formation patterns in an arbitrary order from a database can be avoided, so that steps of the comparison processing can be reduced. User's waiting time can be shortened by a length equivalent to the reduced steps of the comparison processing. Thus, usability can improve.

(3) Other Embodiments

Figure 14:
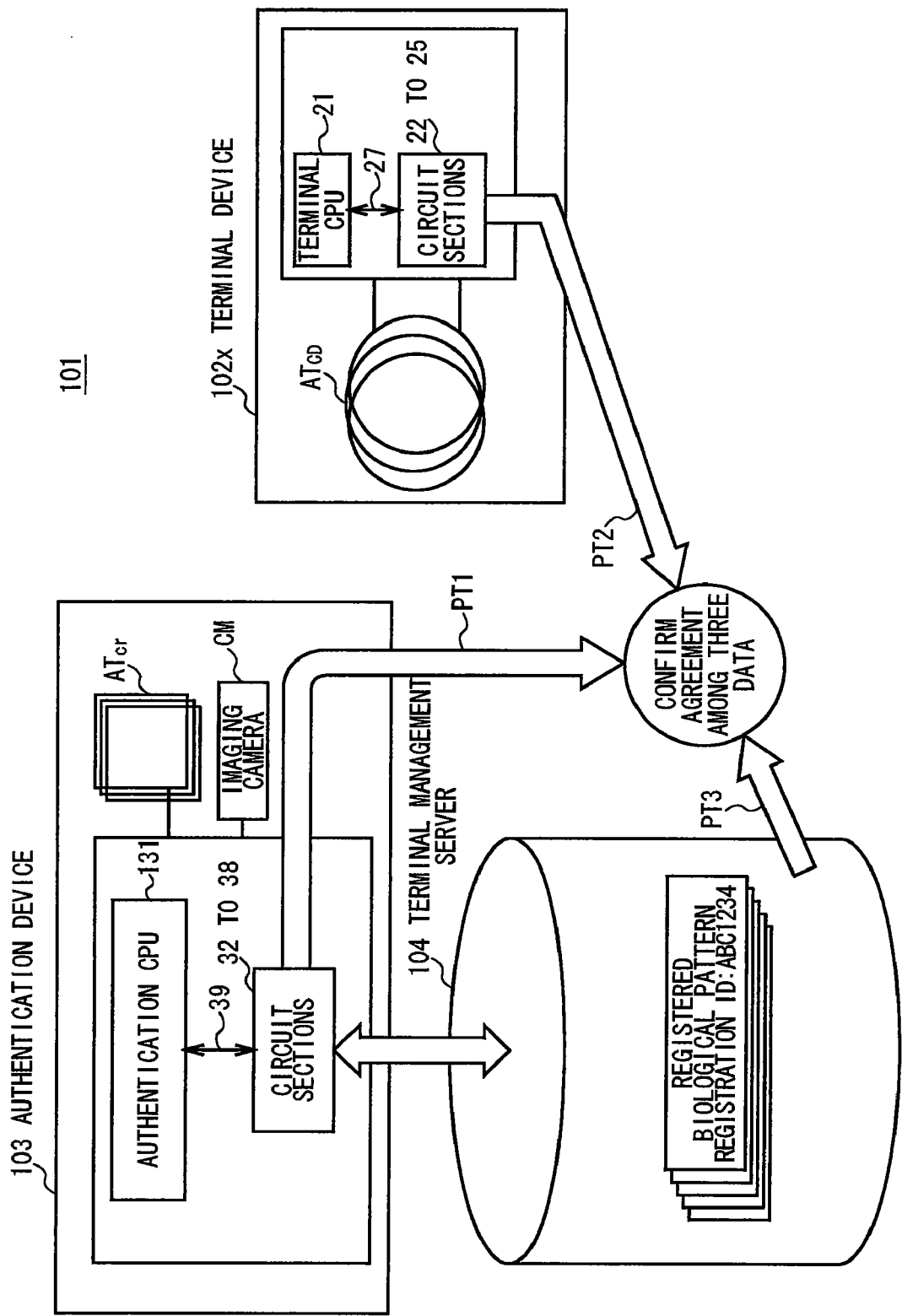
FIG. 14 is a schematic diagram showing biological authentication (1) according to another embodiment.

In the foregoing first embodiment, registered blood vessel formation pattern data are registered in the terminal side (card terminals 2$i$). In the second embodiment, registered blood vessel formation pattern data are registered in the authentication side (authentication device 53). These embodiments have been described with reference to a case in which, when a registered blood vessel formation pattern and another blood vessel formation pattern extracted from a user agree with each other, the user is determined to be a registrant. The present invention, however, is not limited to this case but may be configured as follows. As shown in FIG. 14 in which parts corresponding to those in FIGS. 2 and 5 are denoted by the same reference symbols, registered blood vessel formation pattern data may be registered in both of the terminal 102$x$ and the terminal management server 104 which manages terminal IDs. A user may be determined to be a registrant when three blood vessel formation patterns, i.e., the two registered blood vessel formation patterns and another blood vessel formation pattern extracted from a user by the authentication device 103 agree with one another.

In the information processing system 101 shown in FIG. 14, it is difficult for a third person to steal each of the blood vessel formation pattern data registered in different locations from one another. Even if one of the registered blood vessel formation pattern data is replaced with other data of a third person, this replacement can be detected, and as a result, security can improve much more.

The terminal device 102$x$ may have either a card-like shape or a ring-like shape or may have any other shape. As far as the terminal device 102$x$ is portable, other various shapes are applicable to the terminal device 102$x$. In addition, the near infrared light source LS may be provided on the authentication side as shown in the first embodiment or on the terminal side as shown in the second embodiment.

An authentication processing procedure of the authentication device 103 described above will now be described with reference to the flowchart shown in FIG. 15.

That is, an authentication CPU 131 receives startup notification data D1 from a terminal device 102$x$ which has been brought close to the approach face 3A. Then, the authentication CPU 131 starts the third authentication processing procedure RT3 in subsequent step SP20, and starts up the imaging camera CM (FIG. 2), in subsequent step SP21. At this time, the CPU 131 starts extraction of a blood vessel formation pattern existing in the hand (or finger) grasping or wearing this terminal device 102$x$.

Further, in step SP22, the authentication CPU 131 relays mutual authentication between the terminal device 102$x$ and the terminal management server 104. In subsequent step SP23, the authentication CPU 131 determines whether the mutual authentication is completed successfully, based on management determination data D5 supplied from the terminal device 102$x$ and the terminal management server 104, and on terminal determination data D8.

If this mutual authentication is determined to be completed successfully, the authentication CPU 131 transmits its own authentication encryption key D11 (FIG. 5) to the terminal device 102$x$ in next step SP24. Simultaneously, the authentication CPU 131 obtains a terminal encryption key D12 (FIG. 5) maintained in the terminal device 102$x$ from the terminal device 102$x$. In subsequent step SP25, the authentication CPU 131 decrypts registered blood vessel formation pattern data D13 transmitted in double encrypted form from the terminal device 102$x$, by use of the authentication encryption key D11 and the terminal encryption key D12.

In step SP26, the authentication CPU 131 also mutually exchanges encryption keys with the terminal management server 104 which manages correspondences between terminal IDs and registered blood vessel formation patterns in form of a database, like in various processing in steps SP24 and SP25. The authentication CPU 131 uses the encryption key of the terminal management server 104 and the authentication encryption key D11 of the authentication device 103, to decrypt the registered blood vessel formation pattern data D13 transmitted in double decrypted form. In this respect, the registered blood vessel formation pattern data D13 corresponds to the terminal ID used at the time of mutual authentication, among plural registered blood vessel formation patterns registered in the terminal management server 104.

Further, in next step SP27, the authentication CPU 131 compares a user's blood vessel formation pattern PT1 (FIG. 14) obtained by starting in step SP21, another blood vessel formation pattern PT2 (FIG. 14) expressed by the registered blood vessel formation pattern data D13 obtained from the terminal device 102$x$ in step SP25, and further another blood vessel formation pattern PT3 (FIG. 14) expressed by the other registered blood vessel formation pattern data D13 obtained from the terminal management server 104 in step SP26, with one another. In subsequent step SP28, the authentication CPU 131 determines presence or absence of the person identical to the registrant, based on the comparison result. Thereafter, the authentication CPU 131 goes to step SP29, and terminates the third authentication processing procedure RT3.

Meanwhile, if the mutual authentication is determined to have failed in step SP23, the authentication CPU 131 goes to step SP29 without executing various processings of steps SP24 to SP28 described above. The authentication CPU 131 then terminates the third authentication processing procedure RT3.

Thus, the authentication device 103 can determine presence or absence of the person identical to the registrant, based on registered blood vessel formation pattern data registered in the terminal device 102$x$ and the terminal management server 104 and on the blood vessel formation pattern extracted from the user by the authentication device 103.

The function to determine presence or absence of a registrant may be provided in the terminal management server 104. Even then, biological authentication among three pieces of data can be realized in the same manner as in the third authentication processing procedure RT3 described above, if registered blood vessel formation pattern registered in the terminal device 102x and the terminal management server 104, and the blood vessel formation pattern extracted from the user by the authentication device 103 are collected in the terminal management server 104.

Figure 16:
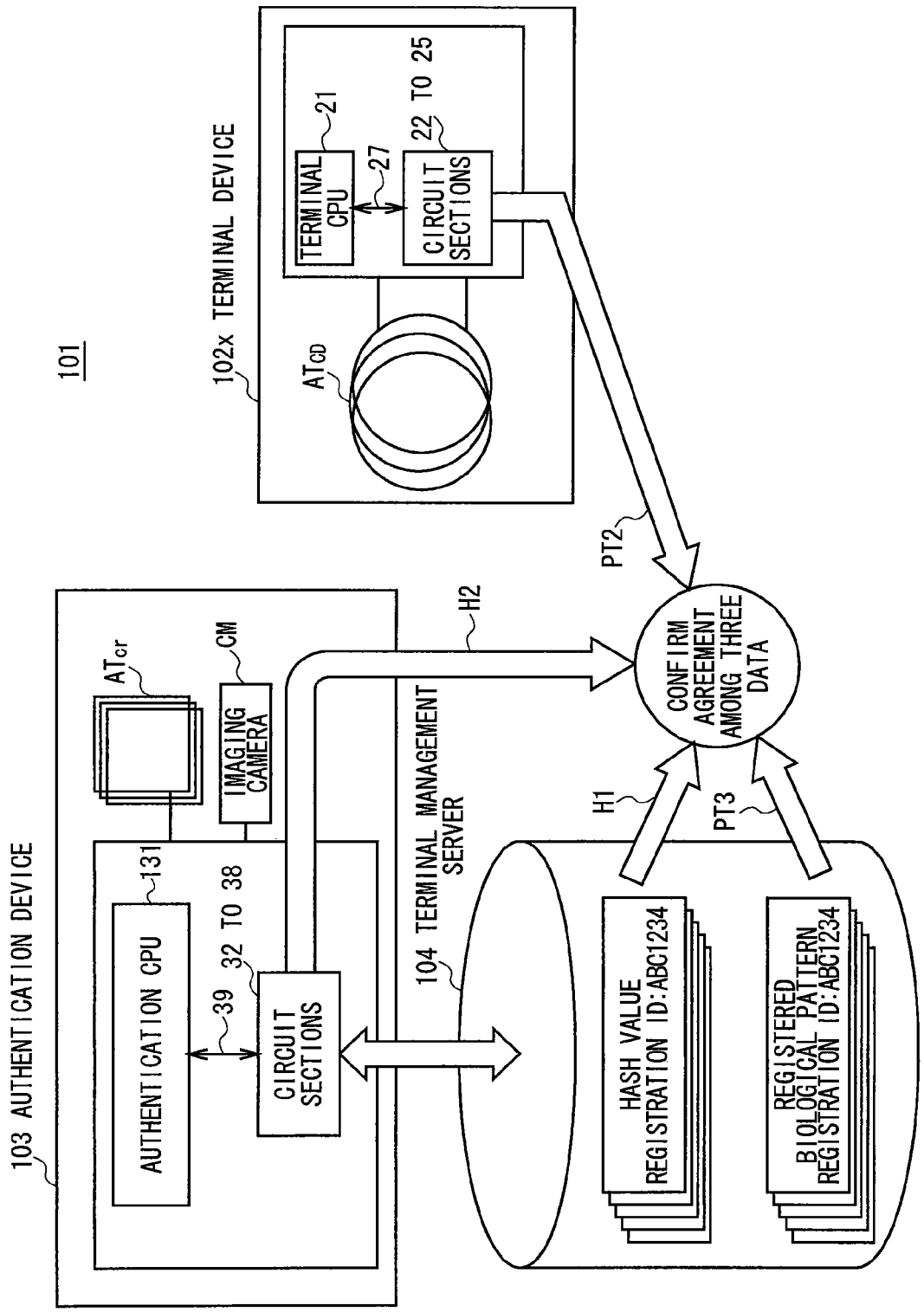
FIG. 16 is a schematic diagram showing biological authentication (2) according to another embodiment.

In another example, registered blood vessel formation pattern data are registered in the terminal device 102x and the terminal management server 104 as registration targets, as shown in FIG. 16 in which parts corresponding to those in FIG. 14 are denoted at the same reference symbols. A hash value generated from data of processing steps up to generation of registered blood vessel formation pattern data is registered in the terminal management server 104 having a management function, with a correspondence established between the hash value and the registered blood vessel formation pattern data.

Further, the authentication device 103 obtains registered blood vessel formation pattern data registered in the terminal device 102x and the terminal management server 104, and compares blood vessel formation patterns PT2 and PT3 expressed by the registered blood vessel formation pattern data with each other. On the other side, the authentication device 103 obtains a hash value H1 corresponding to the registered blood vessel formation pattern data obtained from the terminal management server 104, and compares the hash value H1 with another hash value H2 generated from data of processing steps up to generation of data of the blood vessel formation pattern extracted from the user.

In this manner, a third person can not achieve masquerading before the third person not only steals registered blood vessel formation pattern data but also knows a hash value generation algorithm and from which processing step the data having been used to generate the hash value H2 has been obtained. Therefore, security can much more improve.

Also, the load of the comparison processing can be reduced more by a quantity by which the data quantity is reduced than in another case of comparing registered blood vessel formation pattern data with a blood vessel formation pattern extracted from the user. The user's waiting time an be shortened much more.

Figure 15:
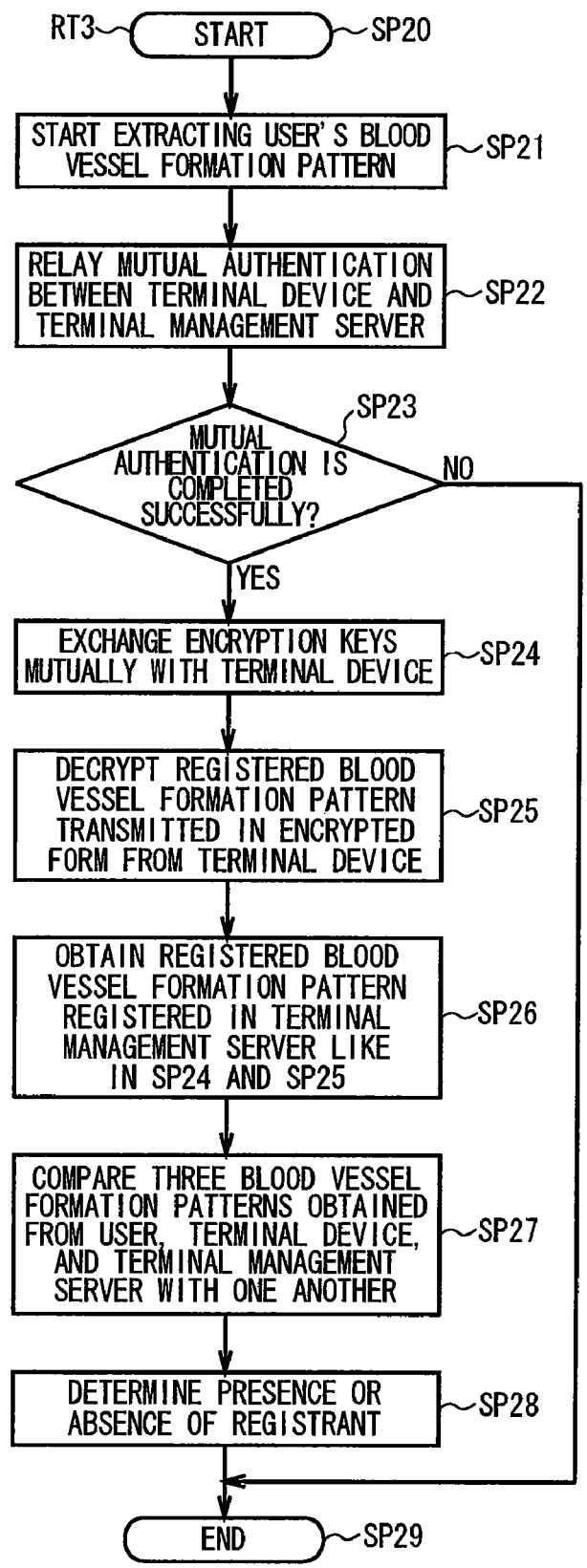
FIG. 15 is a flowchart showing a third authentication processing procedure.
Figure 17:
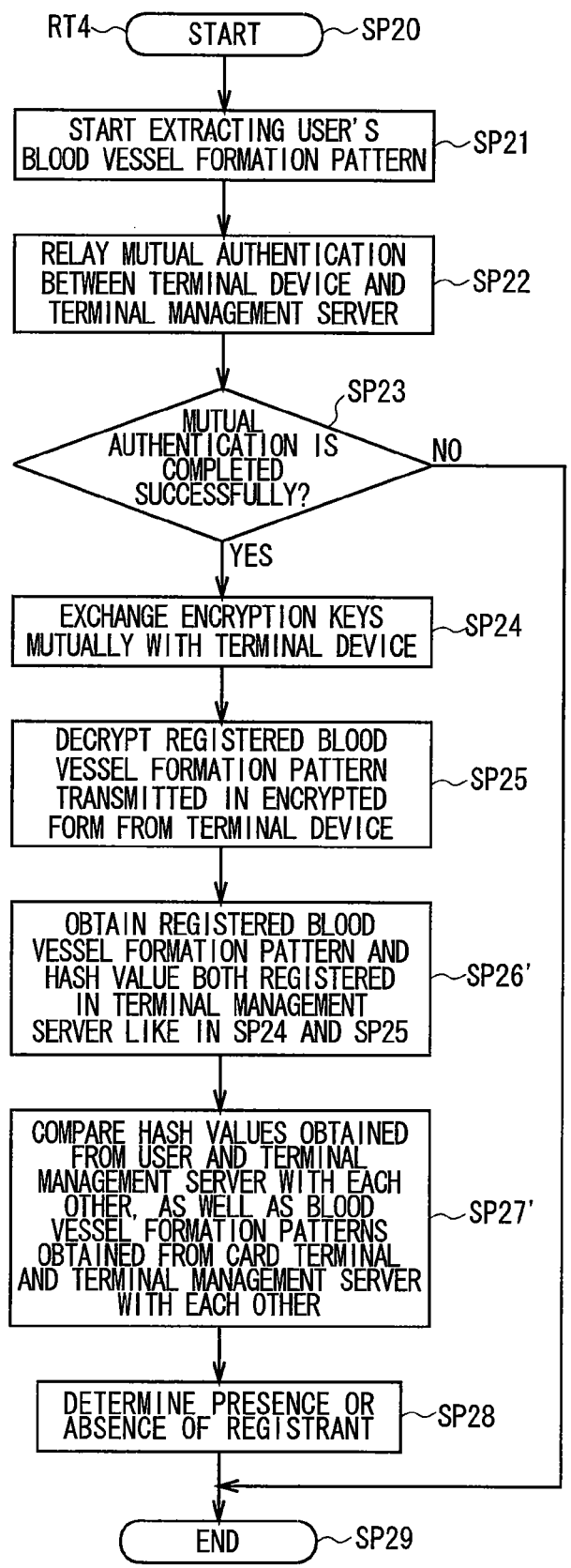
FIG. 17 is a flowchart showing a fourth authentication processing procedure.

In this case, like in the fourth authentication processing procedure RT4 as shown in FIG. 17 in which portions corresponding to those in FIG. 15 are denoted at the same reference symbols, the authentication CPU 131 can execute a biological authentication processing in accordance with a processing procedure similar to the third authentication processing procedure RT3, by merely providing steps SP26' and SP27' in which the targets to be obtained and to be compared in steps SP26 and SP27 are partially changed, in place of steps SP26 and SP27 in the third authentication processing procedure RT3.

Figure 18:
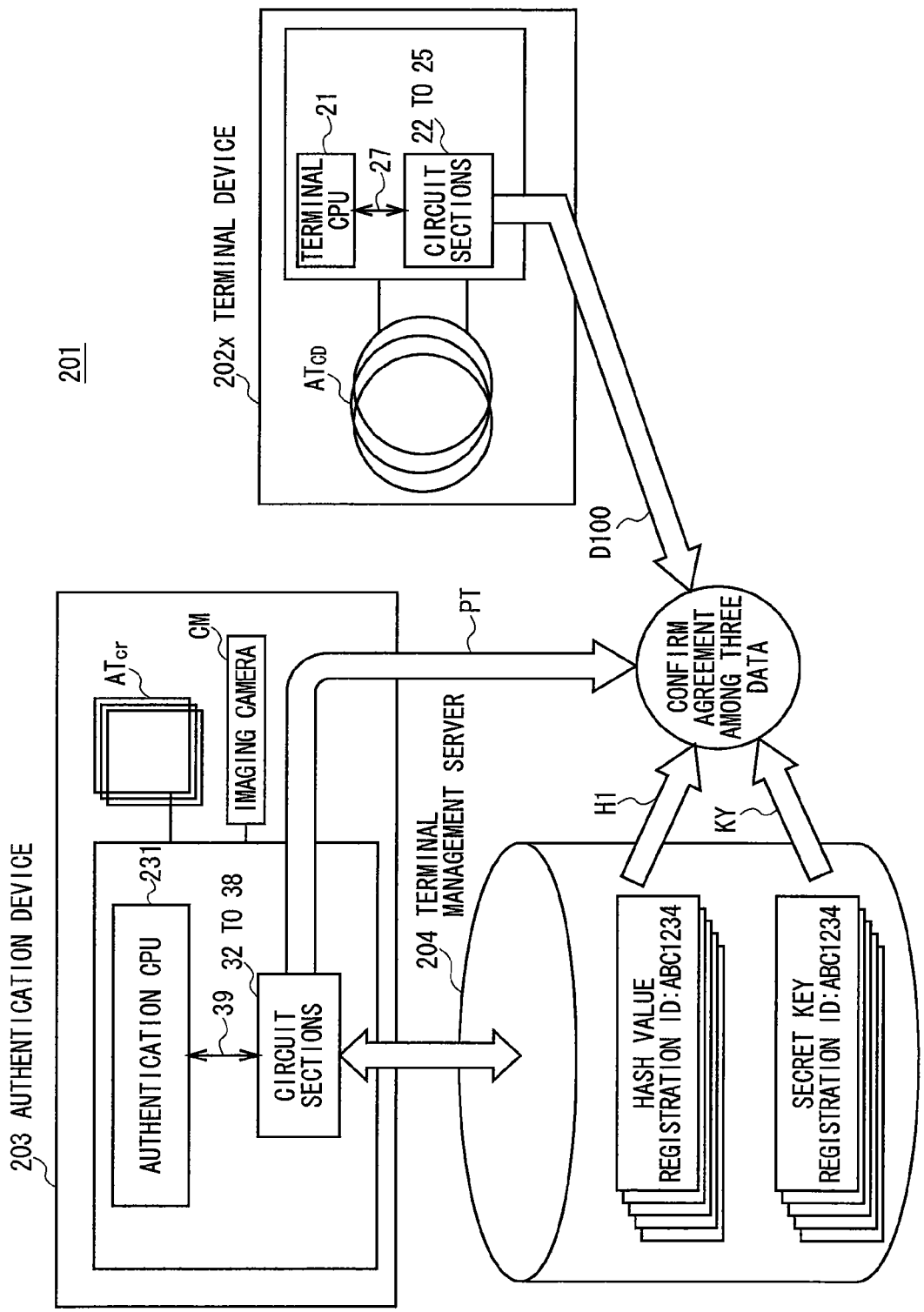
FIG. 18 is a schematic diagram showing biological authentication (3) according to another embodiment.

Further, as another example, an information processing system 201 is applicable, as shown in FIG. 18 in which portions corresponding to those in FIGS. 2 and 5 are denoted at the same reference symbols. In this information processing system 201, blood vessel formation pattern data D100 encrypted by use of a predetermined encryption key are registered in a terminal device 202x. A hash value H1 of the registered blood vessel formation pattern data before encryption and a secret key KY are registered in a terminal management server 204, with a correspondence established between each other.

This terminal device 202x may have either a card-like or ring-like shape or may have another shape. As far as the terminal device 202x is portable, other various shapes are applicable to the terminal device 202x. In addition, the near infrared light source LS may be provided on the authentication side as shown in the first embodiment or on the terminal side as shown in the second embodiment.

When the terminal device 202x is brought close, an authentication device 203 starts extraction of a blood vessel formation pattern existing inside the hand (or finger) grasping or wearing the card terminal 202x. On the other side, the authentication device 203 obtains encrypted blood vessel formation pattern data D100 from the terminal device 202x, and obtains a hash value H1 of registered blood vessel formation pattern data corresponding to the terminal ID of the terminal device 202x and a secret key KY from the terminal management server 204.

Further, the authentication device 203 decrypts the encrypted blood vessel formation pattern data D100 by use of the secret key KY, in accordance with a predetermined algorithm, and generates a hash value from the decrypted registered blood vessel formation pattern data. The authentication device 203 compares the generated hash value (hereinafter called a comparative hash value) with the hash value H1 obtained from the terminal management server 204.

If the comparison result indicates agreement, the authentication device 203 also compares the blood vessel formation pattern PT obtained from the user and another blood vessel formation pattern expressed by the decrypted registered blood vessel formation pattern data.

Thus, in the information processing system 201, an individual secret key KY for the encrypted registered blood vessel formation pattern data D100 is not sent to the terminal device 202x. Unless the secret key KY is known, any third person cannot obtain a comparative hash value from the encrypted blood vessel formation pattern data D100. Therefore, in the information processing system 201, a third person can be determined generally in the first comparison stage of using a hash value, if the encrypted registered blood vessel formation pattern data D100 in the terminal device 202x are replaced or the like. Compared with another case of using a registered blood vessel formation pattern for comparison, the comparison processing load can be remarkably reduced by a quantity by which the data quantity is reduced, so that user's waiting time can be shortened much more.

Also, in this information processing system 201, it is difficult for a third person to steal each of the encrypted registered blood vessel formation pattern data D100, secret key KY, and hash value H1 which are registered indifferent locations from one another. It is also difficult to obtain a comparative hash value from the encrypted registered blood vessel formation pattern data D100 and the secret key KY. Therefore, even if the encrypted registered blood vessel formation pattern data D100 in the terminal device 202x is replaced, this replacement can be detected, and as a result, security can improve much more. In addition, this information processing system 201 does not manage registered blood vessel formation pattern data themselves. It is possible to prevent the flow of the blood vessel formation pattern to the outside and thus security can improve much more.

Further, the information processing system 201 does not manage registered blood vessel formation pattern data themselves. Therefore, processing load due to management of the registered blood vessel formation pattern data can be avoided, and a transmission processing of the registered blood vessel formation pattern data to manage can be avoided. Accordingly, the information processing system 201 can improve processing performance as a whole.

Figure 19:
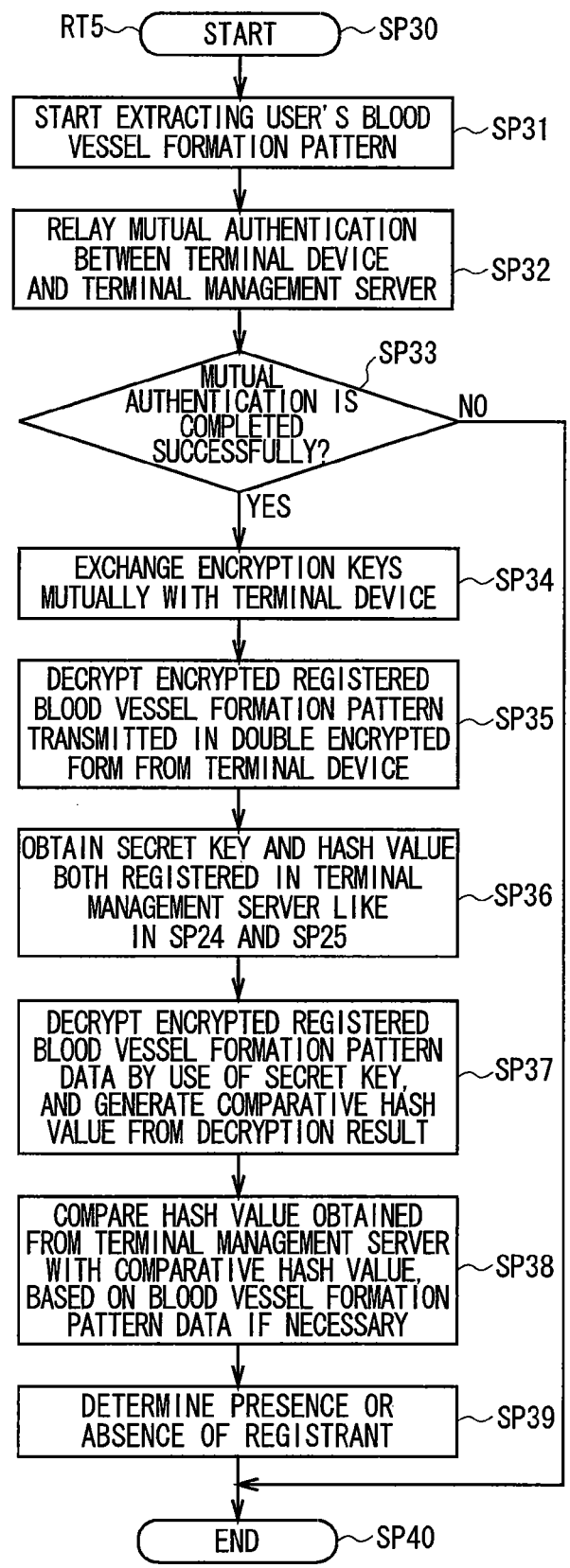
FIG. 19 is a flowchart showing a fifth authentication processing procedure.

An authentication processing procedure of the authentication device 203 will now be described with reference to the flowchart shown in FIG. 19.

That is, an authentication CPU 231 receives startup notification data D1 from a terminal device 202x which has been brought close to the approach face 3A. Then, the authentication CPU 231 starts the fifth authentication processing procedure RT5 in subsequent step SP30, and starts up the imaging camera CM (FIG. 2), in subsequent step SP31. At this time, the CPU 231 starts extraction of a blood vessel formation pattern existing in the hand (or finger) grasping or wearing this terminal device 202x.

Further, in step SP32, the authentication CPU 231 relays mutual authentication between the terminal device 202x and the terminal management server 204. In subsequent step SP33, the authentication CPU 231 determines whether the mutual authentication is completed successfully, based on management determination data D5 supplied from the terminal device 202x and the terminal management server 204, and on terminal determination data D8.

If this mutual authentication is determined to be completed successfully, the authentication CPU 231 transmits its own authentication encryption key D11 (FIG. 5) to the terminal device 202x, in next step SP34. The authentication CPU 231 also obtains a terminal encryption key D12 (FIG. 5) maintained in the terminal device 202x from the terminal device 202x. In subsequent step SP35, the authentication CPU 231 decrypts encrypted registered blood vessel formation pattern D100 (FIG. 18) transmitted in double encrypted form from the terminal device 202x, by use of the authentication encryption key D11 and the terminal encryption key D12.

In step SP36, the authentication CPU 231 also mutually exchanges encryption keys with the terminal management server 204, like in various processings in steps SP34 and SP35. The authentication CPU 231 uses the encryption key of the terminal management server 204 and the authentication encryption key D11 of the authentication device 203, to decrypt the secret key KY and hash value H1 (FIG. 18) transmitted in double decrypted form. In this respect, the secret key KY and hash value H1 correspond to the terminal ID used at the time of mutual authentication, among plural secret keys and hash values registered in the terminal management server 204.

Further, in next step SP37, the authentication CPU 231 decrypts the encrypted registered blood vessel formation pattern data D100 obtained from the terminal device 202x in step SP35 by use of the secret key KY, and generates a comparative hash value from the decrypted registered blood vessel formation pattern data. The authentication CPU 231 then goes to step SP38.

In step SP38, the authentication CPU 231 compares the comparative hash value generated in step SP37 with the hash value H1 obtained from the terminal management server 204 in step SP36. If these values disagree with each other, the authentication CPU 231 compares a blood vessel formation pattern expressed by the registered blood vessel formation pattern data encrypted in step SP37 with another blood vessel formation pattern PT (FIG. 18) of the user obtained by starting in step SP31. In subsequent step SP39, the authentication CPU 231 determines presence or absence of the person identical to the registrant, based on the comparison result. Thereafter, the authentication CPU 231 goes to step SP40 and terminates the fifth authentication processing procedure RT5.

Otherwise, if the mutual authentication is determined to have failed in step SP33, the authentication CPU 231 goes to step SP40 without executing various processings of steps SP34 to SP39 described above. The authentication CPU 231 then terminates the fifth authentication processing procedure RT5.

Thus, the authentication device 203 can realize biological authentication among three pieces of data, based on the encrypted registered blood vessel formation pattern data D100, secret key KY, and hash value H1 which are respectively registered in different locations from one another.

The function to determine presence or absence of a registrant may be provided in the terminal management server 204. Even then, biological authentication among three pieces of data can be realized in the same manner as in the fifth authentication processing procedure RT5 described above, if the encrypted registered blood vessel formation pattern data D100 registered in the terminal device 202x and the blood vessel formation pattern PT extracted from the user by the authentication device 203 are collected in the terminal management server 204.

Figure 20:
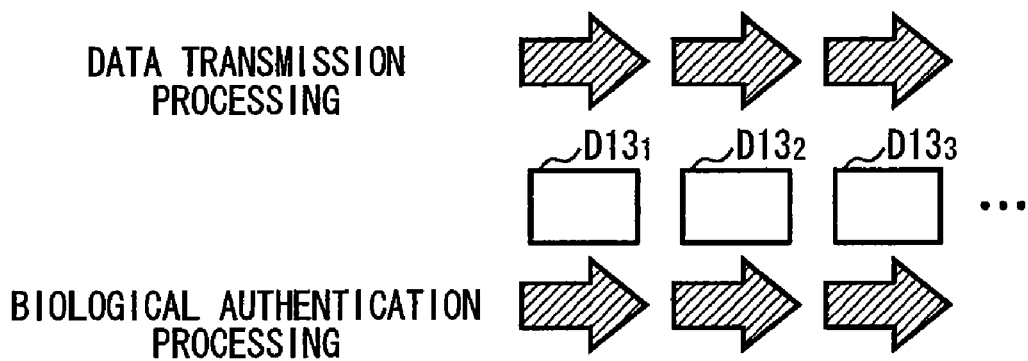
FIG. 20 are schematic diagrams showing a data transmission processing and a biological authentication processing.
Figure 20:
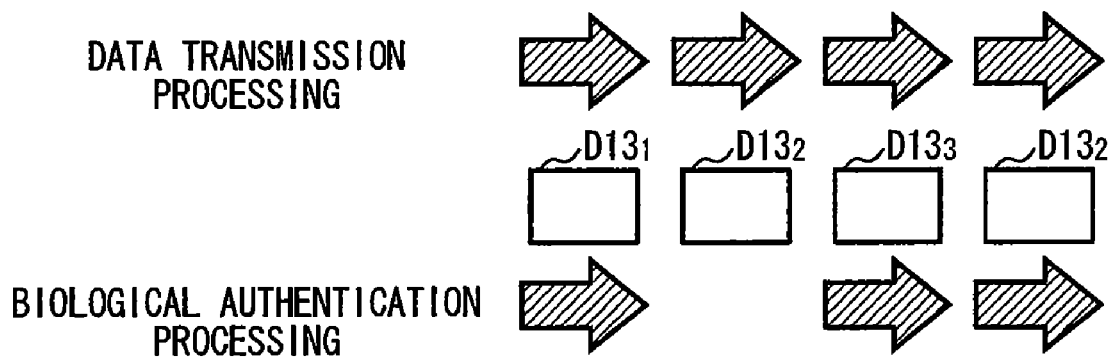

Further, in the above embodiment, there has been no description about a specific relationship between the data transmission processing of transmitting registered blood vessel formation pattern data according to the electromagnetic induction scheme, and the biological authentication processing based on the registered blood vessel formation pattern data. In the present invention, these processing are performed in a relationship as shown in FIGS. 20 (A) and 20(B).

That is, as shown in FIG. 20(A), registered blood vessel formation pattern data D13 as a target to transmit are divided into predetermined units, on the terminal side. The divided data $D13_k$ (k=1, 2, 3, . . . , 1) are transmitted sequentially. On the authentication side, every data $D13_k$ is compared with a corresponding data part of the registered blood vessel formation pattern data D13, in the order of the transmitted data $D13_k$ (biological authentication processing).

On the authentication side, for example, if a datum $D13_2$ could not be received due to a communication error, as shown in FIG. 20(B), the biological authentication processing is suspended, and the terminal side is notified that transmission should be tried again from the datum $D13_2$. Thereafter, on the authentication side, every time a datum $D13_k$ is transmitted starting from the datum $D13_2$, the datum $D13_k$ and a corresponding data part of the registered blood vessel formation pattern data D13 are compared with each other.

In this manner, load of the transmission and comparison processing can be reduced, compared with another case of retrying transmission and comparison of the registered blood vessel formation pattern data D13 from the very first step every time a communication error occurs. Therefore, user's waiting time can be much more shortened.

Further, the above embodiments have been described with reference to a case of application to card-like terminal devices (card terminals 2i in the first embodiment) or terminal devices which can be put on a finger (ring terminals 52i in the second embodiment). However, application is also possible to accessories such as a bracelet, necklace, earrings, glasses, and the like each of which is equipped with a terminal signal processing section $IC_{CD}1$ or terminal signal processing section $IC_{CD}2$ (FIG. 2, 8, or the like) and a terminal antenna $AT_{CD}$ (FIG. 2, 8, or the like). Alternatively, application is possible to portable electronic devices such as a portable cellular phones and PDA (Personal Digital Assistants) each of which is equipped with a terminal signal processing section $IC_{CD}1$ or terminal signal processing section $IC_{CD}2$ (FIG. 2, 8, or the like) and a terminal antenna $AT_{CD}$ (FIG. 2, 8, or the like).

Further, the above embodiments have been described with reference to a case where blood vessels existing in fingers are applied as identification targets in a living body. However, the present invention is not limited to this case. For example, various other biological identification targets can be applied, e.g., neurons existing inside a living body, fingerprints appearing on a living body, glottises, and lip prints are applicable. Incidentally, if neurons are used as authentication targets, for example, a marker peculiar to neurons is implanted into a living body. By imaging the marker, neurons can be dealt with as authentication targets, like in the above embodiments.

In this case, an imaging camera CM is adopted as a biological sensor in the above embodiments. The present invention is not limited to this case but sensors which are eligible for biological identification targets to be applied can be appropriately selected. Alternatively, schemes of extracting a biological identification target as a pattern, which are eligible for biological identification targets to be applied, can be selected appropriately. In case of applying blood vessels as an identification target, a biological sensor having a configuration different from the embodiments described above may be selected. The contents of the pattern extraction section may be appropriately discarded or selected.

Further, the embodiments described above have been described with reference to a case in which blood vessel formation pattern data or a terminal ID is registered, in non-encrypted form, in the memory 22 on the terminal side. The present invention is not limited to this case but the blood vessel formation pattern data or a terminal ID may be registered, in encrypted form, in the internal memory 22.

Further, the embodiments described above have been described with reference to a case in which the authentication section 38 or 77 which compares registered blood vessel formation pattern data with data of a blood vessel formation pattern obtained from a user is provided in the authentication device 3 or 53. The present invention is not limited to this case. In place of the authentication device 3 or 53, an extraction device to extract a user's blood vessel pattern may be provided, and an authentication server is provided for the extraction device via a predetermined network such as the Internet. This authentication server may integrate the function of the authentication section 38. As a result of this, leakage of personal data by sealing of the authentication device 3 or 53 can be obviated effectively. In addition, management or the like of registered blood vessel formation pattern data and the authentication section can be simplified by storing all registered blood vessel formation pattern data in the authentication server.

Further, the embodiments described above have been described with reference to a case in which a mutual authentication processing is executed before executing a biological authentication processing. However, the present invention is not limited to this case but the biological authentication processing may be executed before executing the mutual authentication processing. In this case, blood vessel formation pattern data extracted from a user, which is to be used in the biological authentication processing, can be extracted at various timings in the process of the biological authentication processing and the mutual authentication processing.

Further, the second embodiment has been described with reference to a case in which a flicker pattern of having flickered the near infrared light sources LS and a luminance pattern of the blood vessel image signal S10j obtained as an imaging result are compared with each other. In accordance with the comparison result, presence or absence of a registrant is determined based on a blood vessel formation pattern. The present invention is not limited to this case but the determination function may be applied to the information processing system 1 (FIG. 1) or the information processing system 101 (FIG. 14). In this case, flicker pattern data to flicker the near infrared light sources LS are generated from encrypted seed data D20a and diffusion data D20b, on the terminal side. However, the flicker pattern data may be maintained in advance on the terminal side.

Further, the second embodiment has been described with reference to a case in which registered blood vessel formation pattern data associated with plural terminal IDs are stored in the hard disk 73. The present invention is not limited to this case but the data may be recorded on various other recording media than hard disks. Alternatively in place of the hard disk, an authentication server may be provided via a predetermined network such as the Internet. Registered blood vessel formation pattern data may be stored in the authentication server.

Further, the second embodiment described above has been described with reference to a case in which registered blood vessel formation pattern data corresponding to a terminal ID are specified from a database. The present invention is not limited to this case but various other inherent identifiers may be associated with registered blood vessel formation pattern data. Based on the identifiers, registered blood vessel formation pattern data may be specified from a database.

INDUSTRIAL APPLICABILITY

The present invention is applicable to cases of determining presence or absence of a registrant for a user who uses a portable product.

EXPLANATION OF REFERENCED NUMERALS 1, 51, 101, 201 . . . INFORMATION PROCESSING SYSTEM, 2i(i=1, 2, . . . , 2x. . . CARD TERMINAL, 52i(i=1, 2, . . . , N), 52x. . . RING TERMINAL, 102x, 202x, . . . TERMINAL DEVICE, 3, 53, 103, 203 . . . AUTHENTICATION DEVICE, 4 . . . CARD TERMINAL MANAGEMENT SERVER. 104, 204 . . . TERMINAL MANAGEMENT SERVER, 21, 61 . . . TERMINAL CPU, 31, 71, 131, 231 . . . AUTHENTICATION CPU, 22, 32, . . . INTERNAL MEMORY, 23, 33 . . . TRANSMISSION/RECEPTION SECTION, 24, 34 . . . ENCRYPTION/DECRYPTION SECTION, 25 . . . RANDOM NUMBER GENERATION SECTION, 35 . . . NETWORK INTERFACE, 36 . . . DRIVE CONTROL SECTION, 37, 75 . . . PATTERN EXTRACTION SECTION, 38, 77 . . . AUTHENTICATION SECTION, 73 . . . HARD DISK, 74 . . . LUMINENCE PATTERN GENERATION SECTION, 76 . . . FLICKER PATTERN COMPARISON SECTION, CM . . . IMAGING CAMERA, LS . . . NEAR INFRARED LIGHT SOURCE, ATCD . . . TERMINAL ANTENNA, ATcr . . . AUTHENTICATION ANTENNA, ICCD1, ICCD2 . . . TERMINAL SIGNAL PROCESSING SECTION, ICcr1, ICcr2 . . . AUTHENTICATION SIGNAL PROCESSING SECTION, RT1 . . . FIRST AUTHENTICATION PROCESSING PROCEDURE. RT2 . . . SECOND AUTHENTICATION PROCESSING PROCEDURE, RT3 . . . THIRD AUTHENTICATION PROCESSING PROCEDURE. RT4 . . . FOURTH AUTHENTICATION PROCESSING PROCEDURE, RT5 . . . FIFTH AUTHENTICATION PROCESSING PROCEDURE

The invention claimed is:

1. An information processing system comprising:
a first information processing apparatus and an authentication device comprising a second information processing apparatus, said first information processing apparatus comprising:
a storage means which stores a first biological identification data associated with a predetermined portion of a subject's living body, and
a first communication means for performing communication when held proximate to the predetermined portion of the subject's living body,
said authentication device comprising:
 a biological sensor which detects biological information from the subject's living body;
 a second communication means connected to the second information processing apparatus and which communicates with the first communication means;
 said second information processing apparatus comprising:
  an extraction means which extracts a second biological identification data from the biological information detected by the biological sensor while the first communication means transmits the first biological identification data to the second communication means; and
  a biological authentication means which performs biological authentication, based on the second biological identification data and on the first biological identification data;
a network connected to the second information processing apparatus;
the authentication device connected to the network that performs mutual authentication between the first information processing apparatus and a management server using the second information processing apparatus connecting to a management server via the network,
wherein,
if mutual authentication between the first information processing apparatus and the management server is confirmed by the authentication device, the first information processing apparatus and the second information processing apparatus exchange information for encrypting and decrypting the first biological information.

2. An authentication device comprising:
a biological sensor which detects biological information from a living body when held proximate to a predetermined position of the living body;
a communication target which stores biological identification data;
a near-distance communication means which communicates with the communication target;
an extraction means which extracts biological identification data from the biological information detected by the biological sensor while the communication target transmits the stored biological identification data to the near-distance communication means;
a biological authentication means which compares the stored biological identification data with the detected biological identification data;
a network connected to the near distance communication means; and
an authentication processing unit connected to the network that performs mutual authentication between the communication target and a management server via the near-distance communication means and the network connected to the management server,
wherein,
if mutual authentication between the communication target and the management server is confirmed by the authentication processing unit, the communication target and the near distance communication exchange information for encrypting and decrypting the stored biological identification data.

3. The information processing apparatus according to claim 2, further comprising network communication means which communicates with a management server which manages the biological identification data registered in the communication target, establishing a correspondence thereof,
wherein,
 the biological authentication means compares mutually one another of the biological data at the predetermined portion, extracted by the extraction means, the biological identification data obtained from the management server via the network communication means, and the biological identification data obtained from the communication target via the near-distance communication means.

4. The information processing apparatus according to claim 2, further comprising network communication means which communicates with a management server via a predetermined network, the management server managing the biological identification data registered in the communication target and compressed data by use of data obtained in a process up to generation of the biological identification data, with a correspondence established between the biological identification data and a compressed data, wherein:
 the extraction means generates the compressed data by use of data obtained in a process up to extraction of the biological data at the predetermined portion from the biological data detected by the biological sensor; and
 the biological authentication means compares the compressed data generated by the extraction means with the compressed data obtained from the management server via the network communication means.

5. The information processing apparatus according to claim 4, wherein the biological authentication means compares the compressed data generated by the extraction means with the compressed data obtained from the management server via the network communication means, as well as the biological data at the predetermined portion, extracted by the extraction means, with the biological identification data obtained from the communication target via the near-distance communication means.

6. The information processing apparatus according to claim 2, wherein:
 the communication target is provided with a light source;
 the information processing apparatus further comprises (a) generation means which generates a flicker pattern to control a flickering state of the light source, and (b) encryption means which encrypts the flicker pattern generated by the generation means; and
 the biological authentication means compares the flicker pattern with a luminance pattern of the biological data, which is detected by the biological sensor through the living body brought close to the predetermined position and emitted with light flickered in accordance with the flicker pattern from the light source in the communication target brought close to the predetermined position.

7. An information processing system comprising:
equipment means which is equipped on a predetermined portion of a living body and has (1) a storage means which stores a first biological identification data associated with the predetermined portion of the living body; and (2) a communication means which is held by the equipment means and transmits the first biological identification data directly to a communication target to which the predetermined portion equipped with the equipment means is brought close;

a biological authentication means which performs biological authentication, based on the first biological identification data and on a second biological identification data, said second biological identification data being extracted from biological information detected by a biological sensor while the communication means transmits the first biological identification data to the communication target;

a network connected to the biological authentication means; and an authentication processing unit connected to the network that performs mutual authentication between the equipment means and a management server via the biological authentication means connecting to the management server via the network, wherein, if mutual authentication between the equipment and the management server is confirmed by the authentication processing unit, the equipment means and the biological authentication means exchange information for encrypting and decrypting the first biological identification data.

8. The information processing apparatus according to claim 7, further comprising voltage accumulation means which accumulates a voltage induced in response to reception of a signal supplied from the communication target, wherein the communication means transmits the biological identification data to the communication target, using the voltage accumulated by the voltage accumulation means as an electromotive force.

9. The information processing apparatus according to claim 7, wherein:

the equipment means is constituted by (a) a circular ring portion, and (b) a light source which is provided on the ring portion and emits imaging light on the identification target at the predetermined portion; and the imaging light is guided to an imaging element provided on the communication target, through the living body brought close to the communication target.

10. The information processing apparatus according to claim 7, wherein:

the imaging light is flickered in accordance with a flicker pattern supplied from the communication target; and the flicker pattern is compared with a luminance pattern of images sequentially generated on the basis of the imaging light.

* * * * *